United States Patent [19]

Pease et al.

[11] Patent Number: 4,837,426

[45] Date of Patent: Jun. 6, 1989

[54] OBJECT VERIFICATION APPARATUS AND METHOD

[75] Inventors: Kevin J. Pease, Glenview; Robert A. Copella, Northbrook; Ann M. Flannery, Chicago, all of Ill.

[73] Assignee: Rand, McNally & Company, Skokie, Ill.

[21] Appl. No.: 3,954

[22] Filed: Jan. 16, 1987

[51] Int. Cl.⁴ ............................................. G06K 7/00
[52] U.S. Cl. ................................. 235/440; 235/380; 235/437; 235/448; 235/493
[58] Field of Search ............... 235/380, 432, 437, 440, 235/449, 493

[56] References Cited

U.S. PATENT DOCUMENTS

| | | |
|---|---|---|
| 3,636,318 | 1/1972 | Lindstrom et al. . |
| 3,691,350 | 9/1972 | Kuhns et al. ........................ 235/380 |
| 3,790,754 | 2/1974 | Black et al. . |
| 3,894,756 | 7/1975 | Ward . |
| 3,940,795 | 2/1976 | Lemelson ............................ 235/449 |
| 3,959,630 | 5/1976 | Hogberg . |
| 4,013,894 | 3/1977 | Foote et al. ......................... 235/380 |
| 4,034,211 | 7/1977 | Horst et al. . |
| 4,038,596 | 7/1977 | Lee ...................................... 235/449 |
| 4,066,910 | 1/1978 | Swift ................................... 235/454 |
| 4,092,526 | 5/1978 | Beck .................................... 235/493 |
| 4,094,462 | 6/1978 | Moschner ........................... 235/449 |
| 4,114,032 | 9/1978 | Brosow et al. ..................... 235/440 |
| 4,180,207 | 12/1979 | Lee ...................................... 235/440 |
| 4,218,674 | 8/1980 | Brosow et al. ..................... 235/380 |
| 4,303,949 | 12/1981 | Peronnet ............................. 235/493 |
| 4,396,902 | 8/1983 | Warthan et al. .................... 235/440 |
| 4,423,415 | 12/1983 | Goldman ............................ 235/493 |
| 4,476,468 | 10/1984 | Goldman ............................ 235/380 |
| 4,507,550 | 3/1985 | Fleer ................................... 235/493 |
| 4,574,190 | 3/1986 | Nishimura .......................... 235/449 |
| 4,587,411 | 5/1986 | Obstfelder et al. ................ 235/475 |
| 4,723,071 | 2/1988 | McGeary ............................ 235/449 |

FOREIGN PATENT DOCUMENTS

| | | |
|---|---|---|
| 829778C2 | 1/1980 | Fed. Rep. of Germany . |
| 529398 | 11/1972 | Switzerland . |
| 569333 | 11/1975 | Switzerland . |
| 1535340 | 12/1978 | United Kingdom . |
| 1546053 | 5/1979 | United Kingdom . |

Primary Examiner—Patrick R. Salce
Assistant Examiner—Anita M. Ault
Attorney, Agent, or Firm—Dressler, Goldsmith, Shore, Sutker & Milnamow, Ltd.

[57] ABSTRACT

Apparatus and methods of verifying objects utilize an inherent randomly varying and detectable characteristic of a recordable magnetic region affixed to the object. Detectability of the randomly varying magnetic characteristic can be enhanced by recording a selected electrical signal thereon. Digital and analog signals may be used. Both saturation and nonsaturation forms of recording can be used. A verification apparatus senses the enhanced randomly varying magnetic characteristic and compares it to a prestored representative profile previously created. Correspondence between the prestored profile and the currently read characteristic indicates an authentic object. Other objects can be rejected.

133 Claims, 14 Drawing Sheets

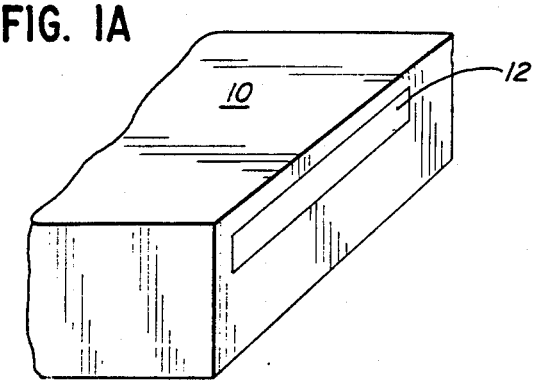
FIG. 1A
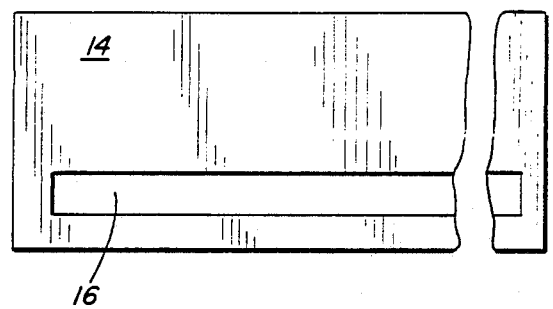
FIG. 1B
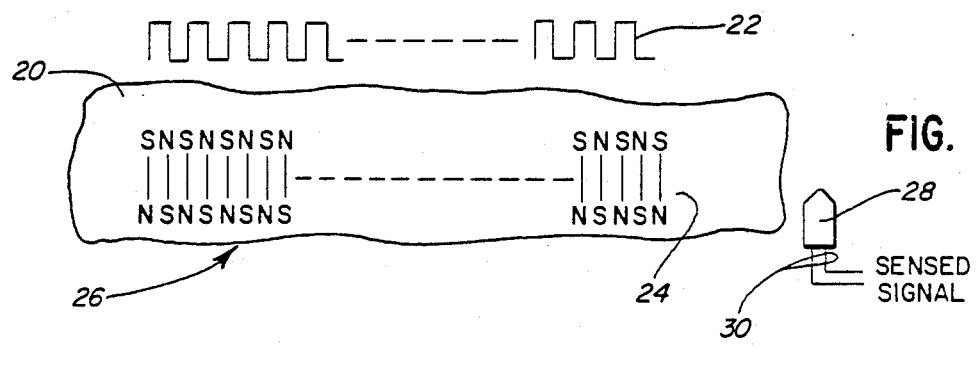
FIG. 2
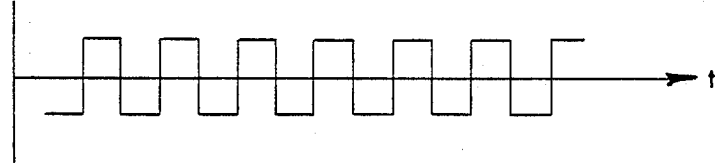
FIG. 3A
FIG. 3B
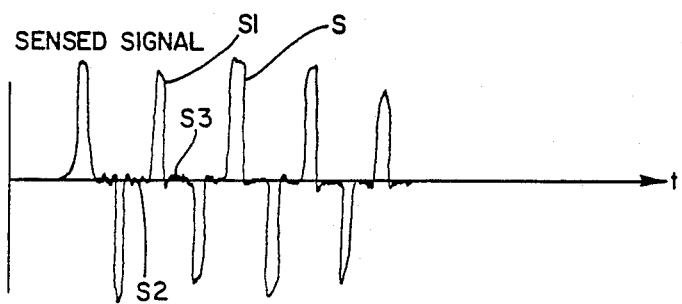
FIG. 3C

OBJECT VERIFICATION APPARATUS AND METHOD

FIELD OF THE INVENTION

The invention pertains to objects whose authenticity can be verified. More particularly, the invention pertains to both documents and other types of objects which carry a magnetic region. The magnetic region can be used to verify the authenticity of the document or other object.

BACKGROUND OF THE INVENTION

Problems associated with the forging or counterfeiting of various types of documents are longstanding and well known. For example, forgery of negotiable instruments, currency or other documents of value is a continuing and ongoing problem to issuers of such documents.

Historically, attempts have been made to protect such documents by using special types of paper in combination with various printing techniques.

Techniques that have been developed include the use of papers which have optically discernible characteristics such as water marks. Alternately, the incorporation of planchets is well recognized in the creation of paper to be used for negotiable instruments. More recently, papers have been created that include detectable metal threads.

Printers have developed embossing techniques as well as techniques for the creation of randomly varying optically discernible characteristics which can be created during the printing process. Alternate printing techniques have included the use of special inks as well as the use of highly complex printed figures or graphics.

The verification and authentication problem extends to nondocumentary objects of value as well. For example the verification and authentication of paintings of substantial value can be a difficult, expensive and time consuming process. Similarly, the authentication of other types of nondocumentary objects which have value can also be an expensive and a time consuming problem.

Another example of objects of value where there is a continuing and ongoing authentication problem involves magnetic products such as computer disks and video tapes. Large scale and widespread copying of both of these types of objects results in substantial and ongoing losses to the producers of the authentic objects.

The widespread use of plastic credit or debit cards has created yet another set of authentication and verification problems. It is very common for such cards to include pre-recorded magnetic stripes which include transaction related information. This information can include account numbers, credit limits, and/or personal identification codes.

However, such cards have been especially susceptible to forgery in view of the fact that the magnetic encoding is almost always based on one or more publicly known standards. One such standard ANSI x 4.16-1983 is utilized in connection with many pre-recorded magnetic stripes associated with such cards.

Another class of documents which suffers from similar types of forgery and alteration problems includes transportation tickets. Airline tickets represent a particularly difficult problem in that the value of a ticket may vary over several orders of magnitude depending on the length of the trip and the destination. However, the issuing agency may use the same type of document for both inexpensive short trips as well as much more expensive long trips.

Multi-use documents, such as rail transportation tickets, present yet another type of authentication problem. Such documents are magnetically alterable at the time of use to decrease the remaining value of the card. However, if an original, unused document can be both physically and magnetically duplicated to create a usable counterfeit document, the issuing agency can lose substantial proceeds.

Various systems are known which can be utilized to create and authenticate verifiable documents or credit cards. Some of the known systems are optically based. Others are magnetically based.

One known type of system is disclosed in U.S. Pat. No. 4,423,415 issued to Goldman. The system of the Goldman patent makes use of the fact that paper documents have a randomly varying translucency characteristic. The randomly varying translucency is a natural characteristic which results from the process of manufacturing the paper.

In Goldman's system radiant energy, for example a beam of visible light, is directed at a selected portion of a document. The amount of light which passes through the document, as the document is being moved with respect to the beam, can be sensed. The document thus becomes a light modulator.

Because of the nature of the process of making the paper medium, no two documents will have the same variable translucency characteristic. As such, the sensed light which passes through each document can be used as a unique identifier of the document.

In accordance with Goldman's system, a representation of the sense variable translucency characteristic is recorded on the document prior to use. When the document is placed into use, the variable random translucency characteristic is again optically sensed. The sensed characteristic is compared to the representation of the sensed characteristic previously pre-recorded on the document.

In the case of an authentic document, the translucency characteristic sensed at the time of use will correspond in a predetermined manner to the translucency characteristic pre-recorded on the document at the time of creation. A forged document on the other hand, based on a different piece of paper, will not have a sensed characteristic that corresponds to the pre-recorded representation unless the forger has a corresponding set of equipment and knows the details of creation of the authentic document.

A variation of the above described Goldman system is disclosed in U.S. Pat. No. 4,476,468. In this patent, also issued to Goldman, a light dispersing coating is deposited on a surface of a card or other document. Reflected light from the card is sensed and used to create a unique indicia for the document. This indicia can be recorded on the card for later verification purposes. The system of U.S. Pat. No. 4,476,468 can be used with opaque documents since it depends on sensing a reflected light beam. On the other hand, the system of the above-noted U.S. Pat. No. 4,423,415 requires a document which is at least in part translucent.

Alternate optically based systems are illustrated in U.S. Pat. Nos. 4,034,211 and 4,094,462 issued to Host et al. and Moschner respectively. The systems of the Host et al. and Moschner patents utilize a defraction grating affixed to an optically accessible portion of the card or document. Light reflected off of the defraction grating can be sensed and used to form a randomly varying document characteristic. This document characteristic can be encoded on the card for later verification purposes.

U.S. Pat. Nos. 4,114,032 and 4,218,674 both issued to Brosow et al. disclose systems which use fibers of a magnetic or a magnetizeable material. The surface of the document can be coated with such fibers or the fibers can be added to the base material of the document when it is being manufactured. In accordance with systems of the Brosow et al. patents, the presence of the discrete magnetic fibers can be sensed over a portion of the document. The number of sensed fibers can be used as a document identifier. This number can be stored on the card for later comparison during the verification process.

U.S. Pat. No. 4,303,949 issued to Peronnet discloses a magnetically based verification system. The system of the Peronnet patent utilizes a magnetic stripe with a thickness that varies in discrete increments along the length of the stripe.

One way that is disclosed to form discrete thickness variations is to use a two layer stripe. One of the layers is a continuously extending layer. The other layer is a discontinuous layer applied above or below the continuously extending layer. At the time of verification, a signal is written to the multi-layer stripe. The resultant magnetization is then sensed. The physically permanent multi-layer structure results in a certain magnetization characteristic each time that the signal is applied to the stripe. The resultant magnetization characteristic can then be sensed in a read head. Then the stripe can be erased.

The Peronnet patent also discloses forming a stripe with discretely varying thickness increments by removing discrete amounts of material from a very thick stripe. This results in a stripe that has two or more regions with substantially different thickness. For example, the Peronnet patent refers to thickness increments greater than 40% of the base thickness.

U.S. Pat. No. 3,790,754 issued to Black et al. discloses a magnetic verification system that utilizes two different types of magnetic material. One type has a coercivity that is greater than the other type. According to the system of the Black et al. patent, in a preferred mode, two sets of magnetic ink are used to print intereaved bars having different magnetic characteristics. The bars can be sensed to form a digital number usable to identify the document.

While the known systems would appear to be effective with respect to verification of certain types of objects, each has certain limitations. The optically based systems require translucent or reflective surfaces. Many objects, such as credit cards, are not translucent. Other types of objects, such as disks or video tapes are not suitable for self-verification via the use of reflected light systems. Further, many types of products such as sports equipment or clothing do not have the necessary physical characteristics to utilize the known systems.

Known magnetic systems result in increased manufacturing costs and manufacturing complexity. In addition, special inclusions, modifications, magnetic regions or layers distinct from the normal read-write magnetic tracks are often needed.

Hence, there continues to be a need for an authentication/verification system of more general applicability to a variety of objects. Such a system preferably would be very inexpensive and would be integrally includable in the object without requiring that the object have particular physical characteristics.

SUMMARY OF THE INVENTION

In accordance with the invention, a method useable for verification of the authenticity of an object is provided. The object has a continuously extending, recordable, magnetic region positioned thereon. The magnetic region includes a randomly varying magnetic characteristic unique to the object.

The method includes the steps of detecting the randomly varying characteristic of the magnetic region; retrieving a prestored representation of that charateristic; and comparing the detected randomly varying characteristic of the magnetic region to the retrieved and prestored representation. The result of that comparision can also be provided as one of the steps of the method.

In one form of practicing the method, the randomly varying characteristic can be detected on a single layer region of the recordable magnetic material which is allocated only for that purpose. Alternately, the randomly varying magnetic characteristic can be detected in a portion of the magnetic region on which transaction related or other information has been recorded.

The prestored representation of the characteristic can be retrieved from a selected location on the object. Alternately, the prestored representation could be retrieved from a centralized data base.

An apparatus can be used for verifying the authenticity of an object which carries a continuously extending recordable magnetic region. The apparatus detects a randomly varying magnetic characteristic in the region which is unique to the object. The apparatus includes a magnetic detector, such as a read coil, which senses the randomly varying characteristic of the recordable magnetic region.

A prestored representation of the characteristic can be carried on another part of the object and can be detected by appropriate detection circuitry. Alternately, the prestored representation of the characteristic can be retrieved from a centralized data base. The apparatus can also include comparison circuitry for comparing the detected randomly varying characteristic to the retrieved, prestored representation of that characteristic.

In accordance with the invention, a method of making a verifiable object includes a step of providing a base portion. The base portion can be flexible or rigid. In addition, the base portion can assume a variety of shapes and can comprise a variety of types of documents.

A recordable region of magnetic material can be deposited so as to provide a single layer. The magnetic material can be formed as an elongated stripe. Alternately, the region of magnetic material could be formed in any preselected shape.

A continuous, unique, permanent and randomly varying magnetic characteristic of the region is then sensed. This sensed characteristic is used to form a unique representation which can be readily encoded either on the object or stored in a central data base. The representation can be stored on the object in optically visible form which is machine readable, such as in bar code form. Alternately, the representation can be recorded onto a selected region of the magnetic material.

A system for making a verifiable object includes apparatus for applying a recordable, single layer region of magnetic material on the object. The region of magnetic material can be preformed as a section of a magnetic tape. Alternately, the recordable region can be formed by applying a coating in the form of an ink or the like to the object. The coating or ink can carry the magnetic material in combination with a liquid medium or vehicle. The vehicle can be evaporated or dried to provide a solid, single layer region of magnetic material affixed to the object.

A continuous, unique, permanent and randomly varying magnetic characteristic of the magentic material can be sensed by means of a read coil. A unique encoded representation of the sensed characteristic can be formed. This unique representation of the sensed characteristic can be printed onto the object by means of a bar code printer. Alternately, the unique representation could be recorded or written onto a section of the recordable magnetic region by a recording head.

Further in accordance with the invention, a verifiable object can be provided. The verifiable object includes a base region. The base region can be flexible or rigid. The base region can be in the form of a document. Alternately, the base region could be in the form of a utilitarian object such as a computer disk or a video tape, or even an object such as a tennis racket.

The object also includes a recordable region of magnetic material which is positioned on the base portion. The recordable region can be deposited on the base portion. In one form of the invention, the recordable region of magnetic material can be deposited as a coating or ink which can then be dried and hardened. Alternately, the region can be deposited by affixing a preformed magnetic tape to the base portion. The region can be formed as a single layer.

The recordable region of magnetic material includes a permanent, randomly varying magnetic characteristic which is unique to the object. To enhance the detectability of the randomly varying magnetic characteristic, a selected electrical signal can be recorded onto the magnetic material.

The electrical signal can be a discontinuous signal. One usable type of discontinuous signal is a digital signal. Alternately, the electrical signal can be an analog signal. In one embodiment, the electrical signal can be periodic.

In a preferred embodiment, the electrical signal can be recorded on the magnetic medium so as to saturate spaced apart regions thereof. Saturation recording will emphasize to a maximum extent the variations of the magnetic medium.

The electrical signal can be recorded onto the magnetic region at less than saturation levels. In this embodiment, less enhancement of the randomly varying characteristic is achieved. Alternately, the varying magnetic characteristic of an erased or non-recorded magnetic region can be detected by moving the region past a read head. This sensed characteristic is also unique to the magnetic region.

The enhancing signal can be a special signal recorded for that purpose. Alternately, the enhancing signal can be a recorded sequence of information. The recording location and form of the enhancing signal determine the form of the detected randomly varying magnetic characteristic.

In yet another form of the invention, a verifiable object can have a base portion that supports the recordable region of magnetic material. A representation, perhaps in digital form, of the non-uniform magnetic characteristic unique to the object can be carried by the base portion, displaced from that characteristics. This representation can by used later in the verification phase by comparison with a new reading of the region.

Further, the magnetic region can be formed with first and second portions. The first portion can be used for the purpose of encoding or recording selected transaction related information. A second, nontransaction, portion can also be provided. The second portion is displaced from the first portion but may be immediately adjacent thereto. The second portion extends for a selected distance and includes the permanent continuous detectable randomly varying magnetic verification characteristic. A selected electrical signal can be recorded thereon so as to enhance the detectability of that characteristic.

In yet another form of the invention, a verifiable document can be provided. The document can include a flexible or rigid substrate. The substrate can be translucent, opaque or transparent.

The verifiable document includes a recordable magnetic stripe on the substrate. The stripe may be formed by applying it as a single layer slurry which is then cured. The stripe has at least one region with a detectable permanent randomly varying magnetic characteristic.

To enhance the detectability of this varying magnetic characteristic, a preselected electrical signal can be pre-recorded on the region. A representation of the varying magnetic characteristic can be carried by the substrate. This representation can be in the form of information recorded on a portion of the magnetic stripe. Alternately, the representation can be in the form of optically visible characters formed on the substrate.

If desired, the randomly varying magnetic characteristic can be enhanced by locally altering the apparent magnetic characteristics of the stripe. This may be accomplished by placing magnetic symbols on the substrate underlying the magnetic region. Yet another form of enhancement can be achieved by embossing selected regions of the magnetic material so as to physically move some amount of that material. Another enhancement form is referred to above.

If a starting location is specified by indicia associated with the object, the enhancing signal can be erased after the object is initially created. By means of the location defining indicia, the enhancing signal can be re-recorded onto the same location on which it was initially recorded. After the re-recording step, the randomly varying characteristic can again be detected.

In yet another form of a verifiable object, the application of the magnetic material coating can be adjusted such that the coating is applied in a single layer but non-uniformly. Finally, additional magnetic material can be selectively sprayed against the substrate.

Numerous other advantages and features of the present invention will become readily apparent from the following detailed description of the invention and the embodiments thereof, from the claims and from the accompanying drawings in which the details of the invention are fully and completely disclosed as a part of this specification.

DESCRIPTION OF THE DRAWINGS

FIG. 1A is a perspective view of a fragment of a verifiable object in accordance with the present invention;

FIG. 1B is a planar view of a verifiable document in accordance with the present invention;

FIG. 2 is an enlarged, planar, fragmentary view of a portion of a magnetic region illustrating schematically a recorded signal thereon;

FIG. 3A is a plot of a varying enhancing, digital signal as a function of time;

FIG. 3B is a schematic spatial plot of the alignment of magnetic regions in response to recording the enhancing signal of FIG. 3A on a magnetic layer;

FIG. 3C is a plot of a randomly varying analog signal sensed off of the recorded magnetic layer of FIG. 3B enhanced by the signal of FIG. 3A;

DETAILED DESCRIPTION OF THE PREFERRED EMBODIMENT

Figure 3D:
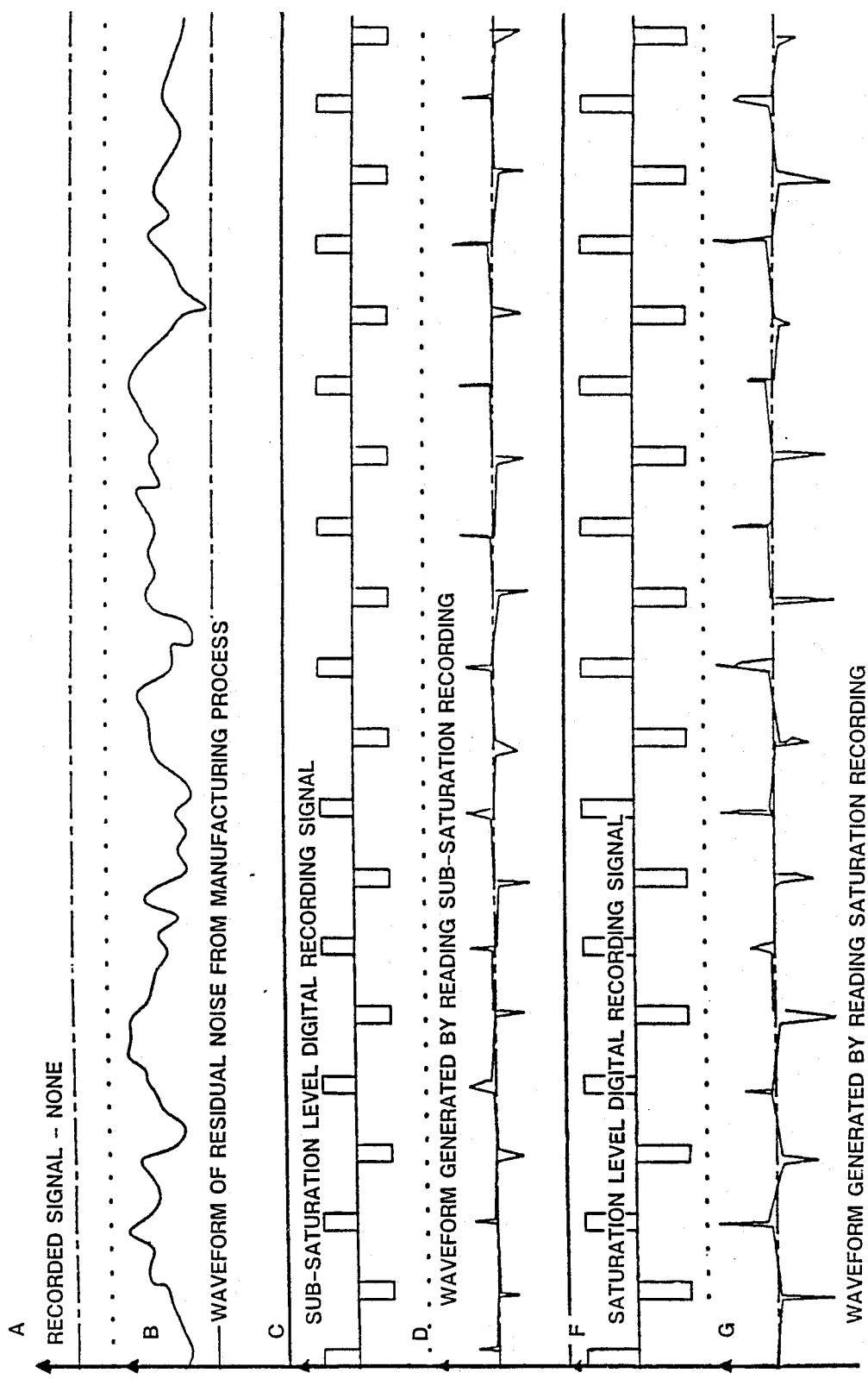
FIG. 3D is a family of plots of waveforms illustrating effects of using different enhancing signals on the detectability of a common randomly varying magnetic characteristic.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

FIG. 1A illustrates a verifiable object 10 having an arbitrary shape with a recordable magnetic region 12 thereon. The region 12 is formed as a single layer and continuously extends over a selected distance. The region 12 contains a randomly varying magnetic characteristic unique to the object.

FIG. 1B illustrates an alternate to the object 10 of FIG. 1A. Object 14 is a document. Formed on the documentary object 14 is a single layer, continuously extending recordable magnetic region 16. The region 16 also contains a detectable randomly varying magnetic characteristic unique to the object. The region 16 can be used to authenticate or identify the document 14 just as the region 12 can be used to authenticate and identify the object 10.

This randomly varying magnetic characteristic is a result of the fact that regions of magnetic material of the type found useful in magnetic recording are not formed with perfectly uniform magnetic characteristics. Rather, such regions of magnetic material have randomly varying detectable characteristics. The detectability of these characteristics can be enhanced and used for authentication of or identification of the objects 10, 14 to which the regions 12, 16 are affixed.

Recordable magnetic materials even in an erased state, display a detectable permanent residual characteristic that can be used for identification and authentication purposes. If an erased strip of recordable magnetic material is moved past a read head of a conventional variety, this residual characteristic can be sensed and converted to a unique time-varying voltage. This voltage can be stored in any convenient form and then can be compared to a voltage generated subsequently off of the magnetic region. The object to which the magnetic region is attached can then be authenticated.

It will be understood that the object to which the region of magnetic material is affixed is not a limitation of the present invention. The object can be opaque, translucent, transparent, rigid or flexible. The present invention is particularly advantageous in this regard. Provided that a region of magnetic material as discussed below can be affixed to the object, the object can be uniquely authenticated and identified.

It will be understood that the shape of the object 10 or 14 to which the magnetic stripe 12 or 16 is affixed is not a limitation of the present invention. Nor, is the shape of the magnetic region notwithstanding the fact that rectangular stripes 12 and 16 are illustrated.

Further, it will be understood that the inherent, detectable randomly varying magnetic characteristic can be further enhanced by a variety of techniques. For example, an underlying, random magnetic pattern can be deposited perhaps by printing, on the substrate. The magnetic layer can be deposited over the magnetic pattern. Alternately, portions of the magnetic section 24 can be physically altered by means of embossing or scratching or other methods of removal of a portion of the magnetic material as to create a more readily detectable characteristic. Yet another alternate includes spraying, in a random fashion, magnetic material onto or beneath the magnetic section 24.

FIG. 2 illustrates a portion 20 of a region of magnetic material such as the region 12 or the region 16. For purposes of explaining the present invention, and without limitation, a discontinuous, periodic and symmetric digital signal 22 has been recorded along a section 24 of the region 20. The signal 22 when recorded on the section 24 enhances and fixes the detectability of the randomly variable magnetic characteristic. The recorded signal 22 can then be permanently carried by the section 24. Alternately, the signal 22 can be erased and rewritten onto the magnetic region as described subsequently.

Altering the location where the signal 22 is recorded on the section 24 or altering the form of the enhancing signal 22 results in enhancing different parts of the randomly varying magnetic characteristic.

For example, while a periodic signal 22 has been illustrated, a non-periodic signal that can be used is a recorded data track on a charge, credit or debit card. While initially used to record information, such signals also enhance portions of a unique random magnetic characteristic of the stripe on such cards. Thus, the present verification method can be used to verify presently known cards or other documents that carry magnetically recorded information.

The recorded signal 22 has been recorded in a known format referred to as F2F or NRZI. This format is self-clocking and known to be usable for magnetic recording. The recorded signal 22 is represented symbolicly on the region 24 by a plurality of spaced apart bar magnets 26 oriented oppositely with respect to one another to reflect the continuously reversing polarity of the signal 22. It will be understood that FIG. 2 is schematic and the precise arrangement of the recorded magnetic regions will depend on the location and orientation of the write head.

Using standard magnetic techniques, the section 24 can be moved past a sensor or read head 28 of a standard variety. This movement will induce an electrical signal in the read head 28 due to the variations in the magnetic region 24 and the pre-recorded enhancing signal 22.

A sensed electrical signal can be detected on a pair of wires 30 coupled to the read head 28. The sensed signal on the lines 30 is in part proportional to the orientation of the magnetic material in the section 24 which results from recording the signal 22 thereon and is in part proportioned to the random magnetic characteristic of the non-uniform magnetic stripe. In a preferred form, the signal 22 is saturation recorded onto the magnetic region. The effect of saturation recording is to enhance and therefore maximize the detectability of the random magnetic characteristic.

The magnetic stripe 12 or 16 can be deposited on an underlying substrate in a variety of way. For example, a slurry or coating or ink including powdered magnetic material can be deposited on a moving web in a printing press. The slurry can then be cured, as dried and hardened, creating a fixedly attached magnetic stripe which is an integral part of the underlying substrate. Alternately, a flexible substrate having an adhesive backing on one side and a magnetic layer deposited on the other side can be fixedly attached to the underlying object. Thus, it will be understood that the exact mechanism by which the magnetic region is affixed to the underlying object is not a limitation of the present invention.

The magnetic stripes 12 or 16 as described above can all be formed with a substantially uniform thickness. For purposes of the present document, thickness variations due to normal manufacturing variations on the order of 10% or 15% will still come within the definition of the phrase "substantially uniform thickness."

The magnetic stripes 12 or 16 as described above can be formed of a single type of magnetic material. Further, no particular orientation need be imparted to the magnetic particles during the manufacturing process.

FIG. 3A is a plot of an exemplary recorded signal, a symmetrical, discontinuous periodic digital signal 22 as a function of time. FIG. 3B is a schematic representation of the orientation of the magnetic material on the section 24 due to the signal 22 saturation recorded on the section 24. FIG. 3C illustrates a plot of the sensed signal S on the lines 30 which is generated by the read head 28 as the section 24 moves past that head.

With respect to the plot of the sensed signal S in FIG. 3C, it should be noted that transitions which are generated on the lines 30 occur as each of the oriented magnetic regions moves past the read head. Further, it should be noted that the peak values of the sensed signal are not regular. Rather, they are continuously varying because of the randomly varying characteristics of the magnetic material in the stripe. The peak values are a function of the amount and characteristics of the magnetic material at each of the locations on which the recorded signal 22 is saturation recorded. It is the peak random variations of the sensed signal S illustrated in the graph of FIG. 3C which are an indication of the continuous randomly varying magnetic characteristic of the region 24. If a non-periodic signal is used, such as would be present on a pre-recorded information track, the randomly varying peak values of the sensed output signal will also be non-periodic.

The sequence of maximum values of the sensed signal represents a measure of a unique, randomly varying magnetic characteristic which is not repeated and which varies from one magnetic region to the next. The sensed signal S illustrated in FIG. 3C can be detected, processed and utilized to create a unique profile for the object. This profile can be used for later comparison with profile signals sensed off of the magnetic strip 16 in the same region so as to determine the authenticity of the object. Each of these peak values, in FIG. 3C such as 51, is interposed between low values 52, 53 that correspond to first and second reference values on the order of zero volts.

Impressing the digital signal onto the region 24 results in enhancement and improved detectability of the randomly varying magnetic characteristic. It will be understood that the invention is not limited to the use of periodic, saturation recorded enhancing digital signals. A non-periodic digital signal saturation recorded could also be used as could a time-varying analog signal to enhance the varying characteristic to facilitate its ease of reading. Both saturation and non-saturation recording of the enhancing signal can be used.

FIG. 3D is a graph of a plurality of plots illustrating the use of enhancing signals to detect the inherent randomly varying characteristic of the magnetic material. Plot A of FIG. 3D illustrates the absence of a recorded signal on a magnetic medium. Plot B illustrates the output from a read head, such as the read head 28, perhaps amplified, as the magnetic medium is moved past the read head. As can be seen from plot B a continuously varying noise level can be sensed. This noise level is inherent in the medium and is repeatable on subsequent rereading of that section of the magnetic material. As noted above, this unenhanced randomly varying waveform of plot B can be recorded and used in subsequent verification of the medium.

Plot C illustrates a subsaturation digital signal recorded on the magnetic medium. While illustrated as a periodic signal in plot C, it will be understood that the effect of the subsaturation level of the digital recording signal will be the same for an aperiodic recording signal. Plot D illustrates a time varying sequence of signals sensed off the read head and subsequently amplified. As can be seen from plot D, the random variations of plot B now appear as random variations in the peak values of the sensed signals from plot D.

Plot F illustrates a digital recording signal with a level great enough to saturate displaced portions of the magnetic region during the recording process. Plot G illustrates the sensed variations of the saturation recorded digital signal of plot F. As can be seen from plot G, the randomly varying peak values in many instances have amplitudes which are greater than the amplitudes of the waveform of plot D. Any of the waveforms illustrated in plots B, D or G could be used for the purpose of creating a representative profile of that particular magnetic region. That profile could be stored and subsequently compared to a later read signal generated off the same portion of the magnetic region. The same magnetic region will generate comparable randomly varying characteristics. As can be seen from the plots D and G, the level and the location of the recorded enhancing signal determines the amplitude and characteristics of the randomly varying magnetic characteristic that are detected for verification purposes.

Figure 3E:
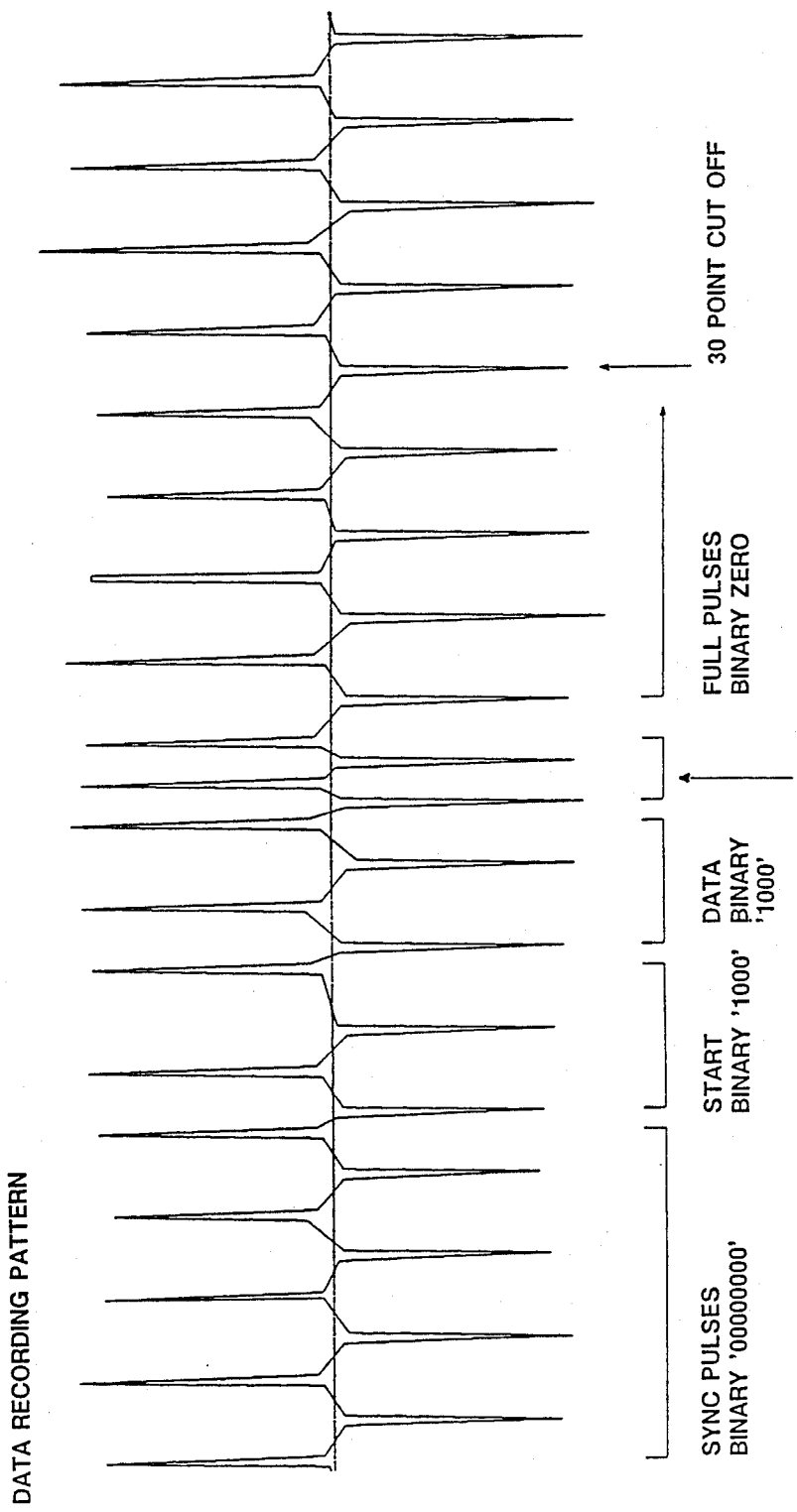
FIG. 3E is a plot illustrating a randomly varying magnetic characteristic enhanced by a saturation recorded, aperiodic enhancing signal.

To further illustrate the versatility of the present method of using various enhancing signals, FIG. 3E illustrates an amplified plot sensed off of a read head such as the read head 28 where the enhancing signal is an aperiodic digital signal, saturation recorded on the medium. With reference to FIG. 3E, a 30 bit digital, aperiodic recording signal was saturation recoded onto a selected magnetic medium. Using hexadecimal notation, the recorded bit sequence was 0088F00 followed by two binary zeros. To the right of the 30 bit sequence a plurality of zeros has been saturation recorded.

The aperiodic nature of the 30 bit saturation recorded enhancing signal is apparent on FIG. 3E due to the varying spacing between the signals generated in the read head as the magnetic medium passed adjacent to it. Further, as can be seen from FIG. 3E the peak values of the signals exhibit a randomly varying pattern of the type discussed previously in plot G of FIG. 3D.

The plot of FIG. 3E could have been read off of a conventional data track of an existing credit, debit, charge or identification card. In normal sensing of the pre-recorded information, the noted peak variations would be ignored. Notwithstanding the fact that a very well-known form of document has been sensed, it is a particular advantage of the present invention that the peak sensed values can be used, as described subsequently, to form a representative profile which can be utilized for verification purposes.

In one embodiment, once recorded on the section 24, the enhancing signal is not erased. It is permanently carried by the object. The verification process will utilize the signal pre-recorded on the section 24.

Alternately, if a "start" mark or indicia is carried by the object, the enhancing signal can be recorded starting at that indicia. The profile can be detected, stored and then the enhancing signal can be erased. Later, when verification is to be carried out, the enhancing signal can be re-recorded using the "start" indicia for purposes of locating where the recording should be made. The profile can then be re-created and compared to the stored representation. The process of re-writing the enhancing signal at the point of verification will increase the security of the verification process.

In yet another embodiment two profiles can be created. One profile can be based on a signal 22 recorded on the magnetic material especially for security purposes. A second profile can be created using a data signal, pre-recorded on a data track. Hence, a dual comparison can be made at the point of verification.

The location of the recorded signal on the magnetic material in part defines the characteristics of the sensed signal S. Changing the location of the recorded signal or changing the characteristics of the recorded signal will result in sensing a different randomly varying magnetic characteristic.

Once the sensed signal S on the lines 30 has been detected, it can be digitized and processed. Signal processing as described subsequently, can be used both for purposes of data compression and for purposes of profile comparison.

Figure 4:
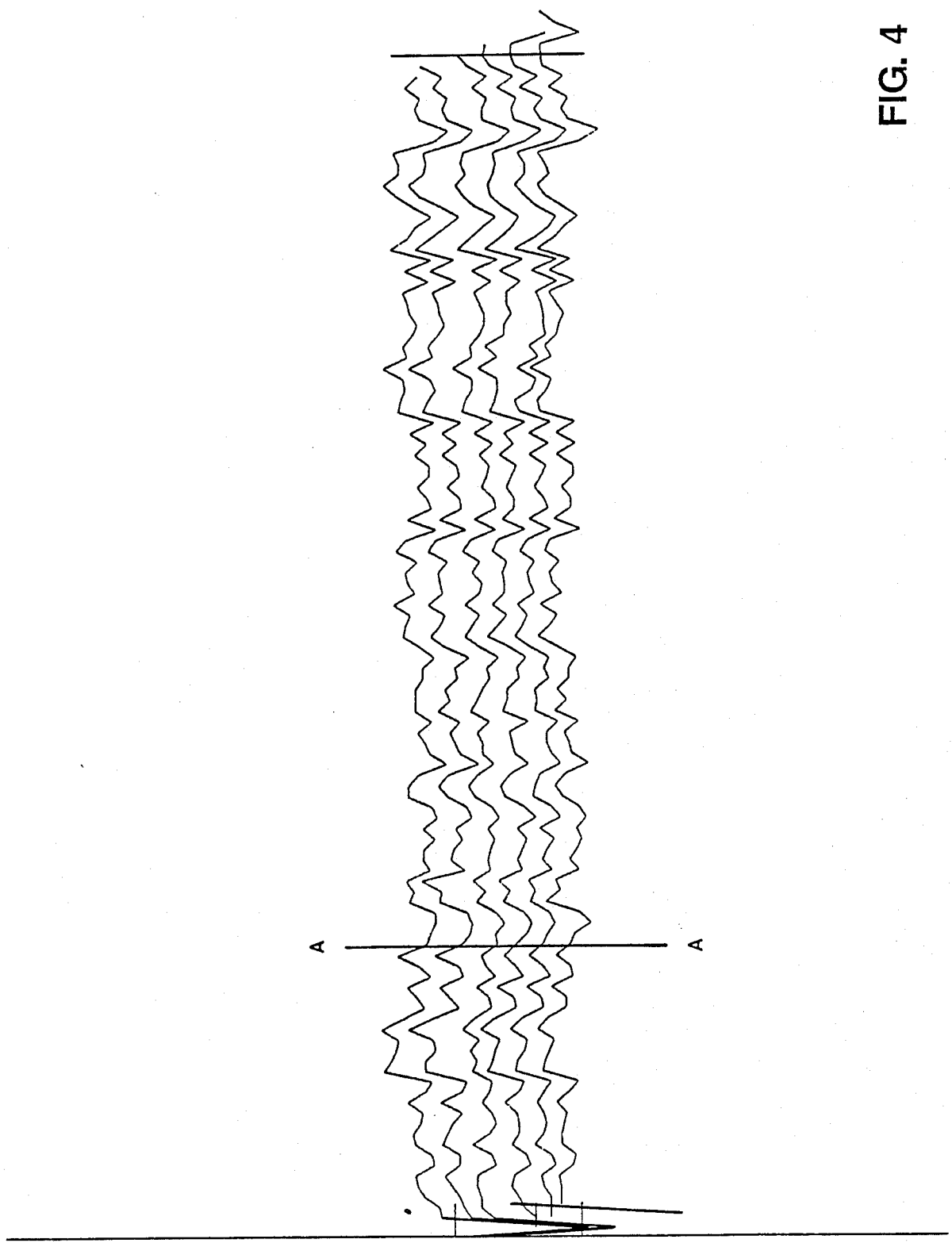
FIG. 4 is a family of six plots of the sensed and processed random magnetic characteristic in the same region of a single object.

FIG. 4 is a graph of six processed signals corresponding to sensed signals on the lines 30. The six plots illustrated on FIG. 4 represent six passes of the same magnetic region, such as the region 24, past a read head 28. This sensed magnetic region was about 2.6 inches long.

The magnetic region noted above had a discontinuous digital signal 30 bits long saturation recorded on it with the bit pattern illustrated in FIG. 3E. The graph left of the line A—A is a representation of a processed profile created from those 30 data points. To the right of the line A—A is a processed profile based on, a 100 bit periodic enhancing wave form such as the waveform 22 that was recorded on the magnetic material.

In each instance, the raw sensed absolute magnitudes of the detected sensed signal have been processed so as to create a usable plot with a compressed data representation. In each instance, the six sensed signals were sensed in the same magnetic region and were processed in precisely the same manner, as will be described subsequently. As can be seen, a very high degree of similarity exists between each of the plots of FIG. 4. Hence, any one of the representations of FIG. 4 could be used as a unique identifier of the corresponding magnetic region.

Figure 5:
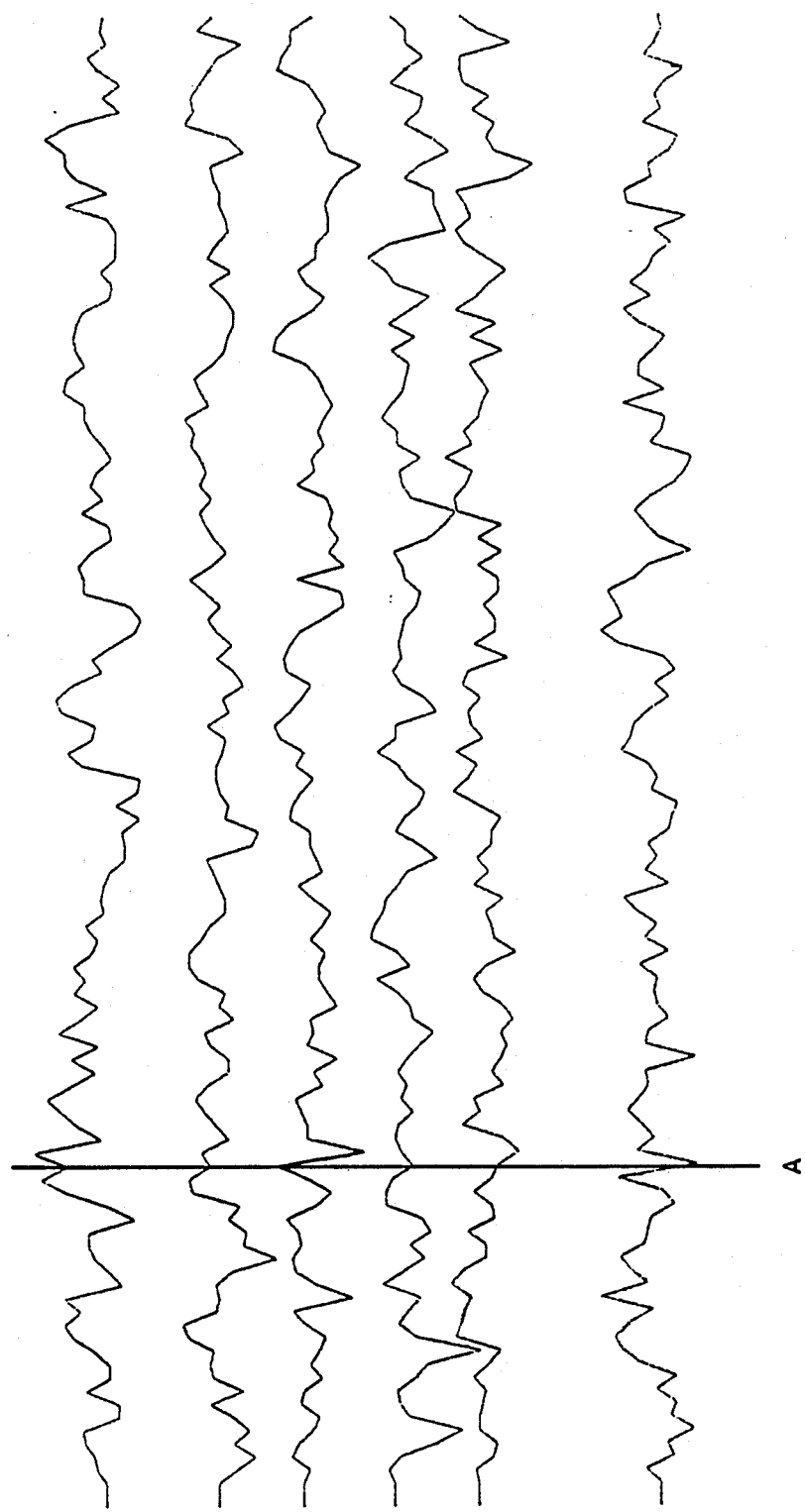
FIG. 5 is a family of six plots of the sensed and processed random magnetic characteristic of six different objects.

In contradistinction, FIG. 5 is a graph of six plots of processed, sensed signals for six different magnetic regions. Each of the six regions had the same 30 bit nonperiodic and 100 bit periodic enhancing signals recorded thereon. Each of the plots of FIG. 5 represents a sensed signal detected on the wires 30 and processed in exactly the same fashion. Each of the plots in FIG. 5 was processed in the same way as was each of the plots of FIG. 4. As can be noted from FIG. 5, each of the processed representations is substantially different from every other representation on FIG. 5.

The differences in the plots in FIG. 5 illustrate the differences in the sensed, inherent randomly varying magnetic characteristic of each of the different magnetic regions. Each of the magnetic regions represented by the plots of FIG. 5 was on the order of 2.6 inches long.

For example, and without limitation, the type of magnetic material used to form the sensed region such as the region 24 was ferric oxide imparticle form such as $\gamma Fe_2O_3$ particles. This magnetic material can be formed into a stripe such as the stripes 12 or 16 having a length of about 5.5 with a width of about 1.585 inches.

Figure 6:
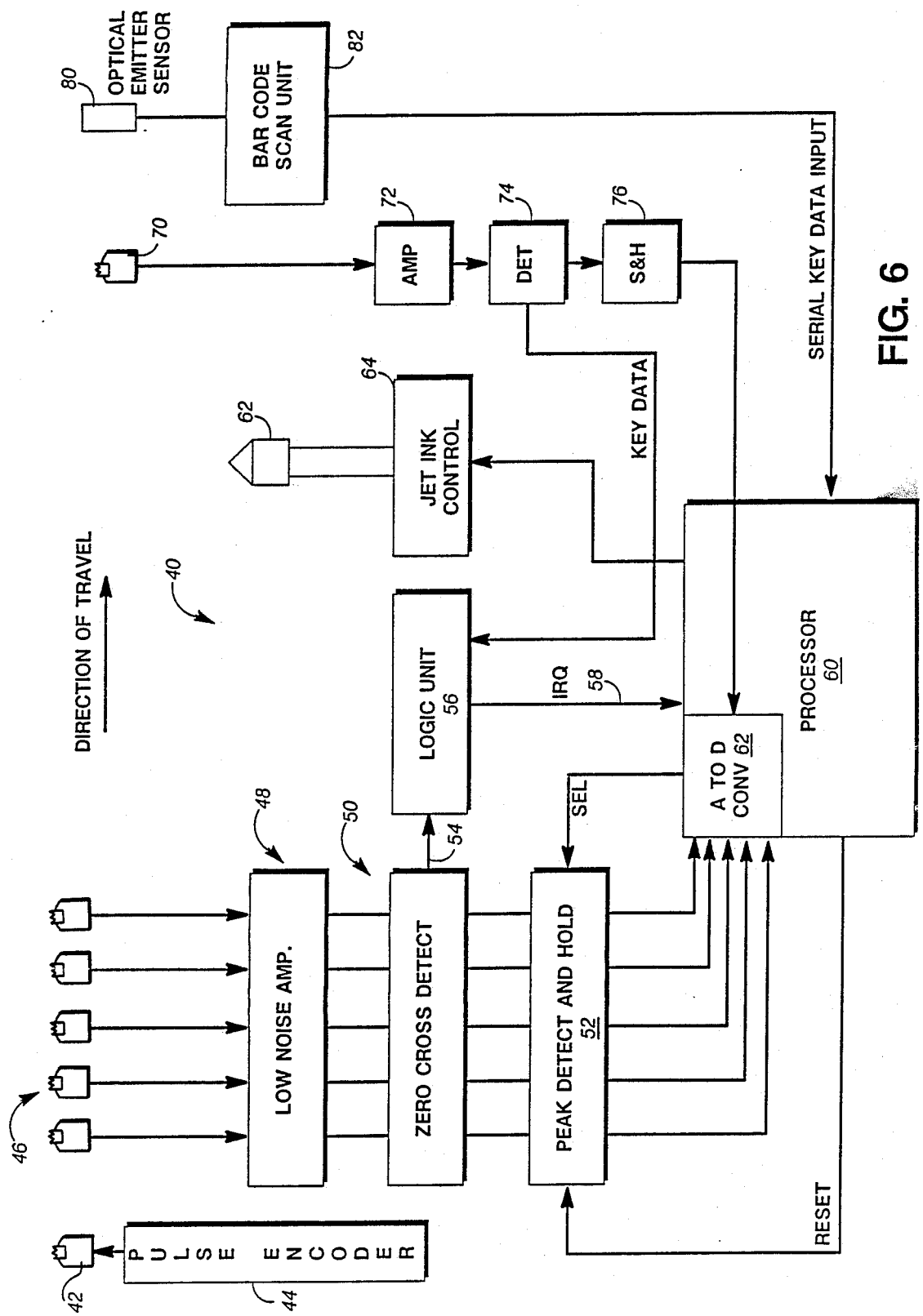
FIG. 6 is a block diagram schematic of a profile sensing and encoding apparatus.

FIG. 6 illustrates an apparatus 40 usable for the purpose of encoding a magnetic region 24 with an enhancing signal corresponding to the digital signal 22, sensing the enhanced randomly varying magnetic characteristic, and recording a representation of that characteristic on the object. The apparatus 40 includes a magnetic write head 42 driven by a pulse encoder 44. As a magnetic region, such as the region 24 moves pass the write head 42, the pulse encoder 44 is rotated. The rotation results in the write head 42 writing the digital signal 22 onto the magnetic region 24 at a rate of either 75 pulses per inch or 210 pulses per inch. Both 75 and 210 pulses per inch are standard writing densities used with commercially available magnetic materials. Non-standard recording densities may also be used.

Immediately subsequent to writing the signal 22 onto the magnetic region 24, a plurality of spaced-apart read heads 46, for example five, reads the enhanced random magnetic characteristic of the region 24. Members of the plurality of read heads 46 read the random characteristic in parallel. Output from each member of the plurality of read heads 46 is coupled to a member of a plurality of low noise amplifiers 48 for amplification purposes. There is one amplifier available for each read head. The plurality of low noise amplifiers 48 is coupled to a plurality of zero crossing detectors 50. In addition, the plurality of low noise amplifiers 48 is also coupled to a plurality of peak detecting sample and hold circuits 52 through the zero crossing detectors 50.

Each member of the plurality of zero crossing detectors 50 is coupled to a respective member of the plurality of low noise amplifiers 48. Similarly, each member of the plurality of sample and whole circuits 52 is coupled to a respective low noise amplifier.

With reference to the sensed analog signal, such as is illustrated in plot G of FIG. 3D, the members of the plurality of sample and hold circuits 52 sense and hold a peak value read by the corresponding one of the read heads 46. On the immediately following zero crossing, the corresponding member of the plurality of zero crossing dectectors 50 senses the zero crossing and generates a control signal on one of a plurality of control lines 54 which feeds a logic and control unit 56. The logic and control unit 56 generates an interrupt signal on an interrupt request line 58 of a programmable processor 60.

The processor 60, in turn, causes an analog to digital converter 62 to convert the respective sensed peak value of the respective sample and hold circuit of the sample and hold circuits 52 into a digital representation. As the magnetic section 24 moves past the plurality of read heads 46, a corresponding plurality of peak digitized values is collected by the processor 60 for each of the five read heads.

The five sets of peak values, which are proportional to the enhanced randomly varying magnetic characteristic of the region 24 can be correlated and converted to a representative profile for subsequent use.

The representative profile generated from the five sets of peak values can then be recorded on the object in one of several different forms. For example, the profile can be encoded on the object 10 or the document 14 by means of a bar code printer 62. The bar code printer 62 can be coupled to the processer 60 by control circuitry 64. Alternately, the profile could be encoded on a portion of the magnetic stripe 12 or 16 displaced from the region 24 in standard magnetic recording format.

The bar code printer has the advantage that a machine readable representation is available which does not take up any portion of the magnetic stripe. On the other hand, encoding the profile on a portion of the magnetic stripe can provide enhanced security.

The apparatus 40 also includes a validation read head 70. The purpose of the validation read head 70 is to provide a immediate rereading of the sensed magnetic region 24 as the object moves through the apparatus 40. Output from the read head 70 is coupled, via an amplifier 72 to a zero crossing detector 74 and a peak sample and hold amplifier 76. On detection of a zero crossing by the detector 74, the logic and control unit 56 generates an interrupt request on the line 58 to the processor 60.

The processor 60, in turn, converts the output of the peak sample and hold circuit 76 to a digital representation so as to recreate the profile of the magnetic region 24. The recreated profile can then be compared to the previously created representative profile for purposes of checking the document.

As a further validation step, the bar code previously printed on the object can be sensed at an optical sensor 80. The sensor 80 is in turn coupled to a bar code scanning unit 82. The scanning unit 82 is in turn coupled to the processor 60. The processor 60 can then compare the sensed and encoded representation of the representative profile to the profile sensed at the validation read head 70. Assuming that there is a correspondence between the two profiles, the object has been properly encoded for authentication purposes and can be removed from the apparatus 40.

It should be noted that during the encoding process as described above, the magnetic stripe 12 or 16 need not be affixed to the related object. If desired, the encoding process can be completed and then the magnetic stripe can be attached to the respective object 10 or 14.

The apparatus 40 of FIG. 6 can be implemented of commercially available components and circuits. Pulse encoder elements 42 and 44 are available as a Magtek unit MT150. Magnetic read heads 46 and 70 are available as a Magtek unit MT211. Low noise amplifiers 48 and 72 can be implemented from circuits found in a publication entitled "*Encyclopedia of Electronic Circuits*" by Rudolf F. Graf published by Tab Books 1985. The zero crossing detectors 50 and 74 as well as the peak detect sample and hold circuits 52 and 60 can be found in the same publication. The processor 60 can be implemented as a Motorola MC68HC11 or an IBM personal computer. The ink jet control and printer unit 62, 64 is available as a Diconix Admark unit. The bar code reading units elements 80 and 82 are available as a Hewlett Packard unit BCS-7100.

Figure 7A:
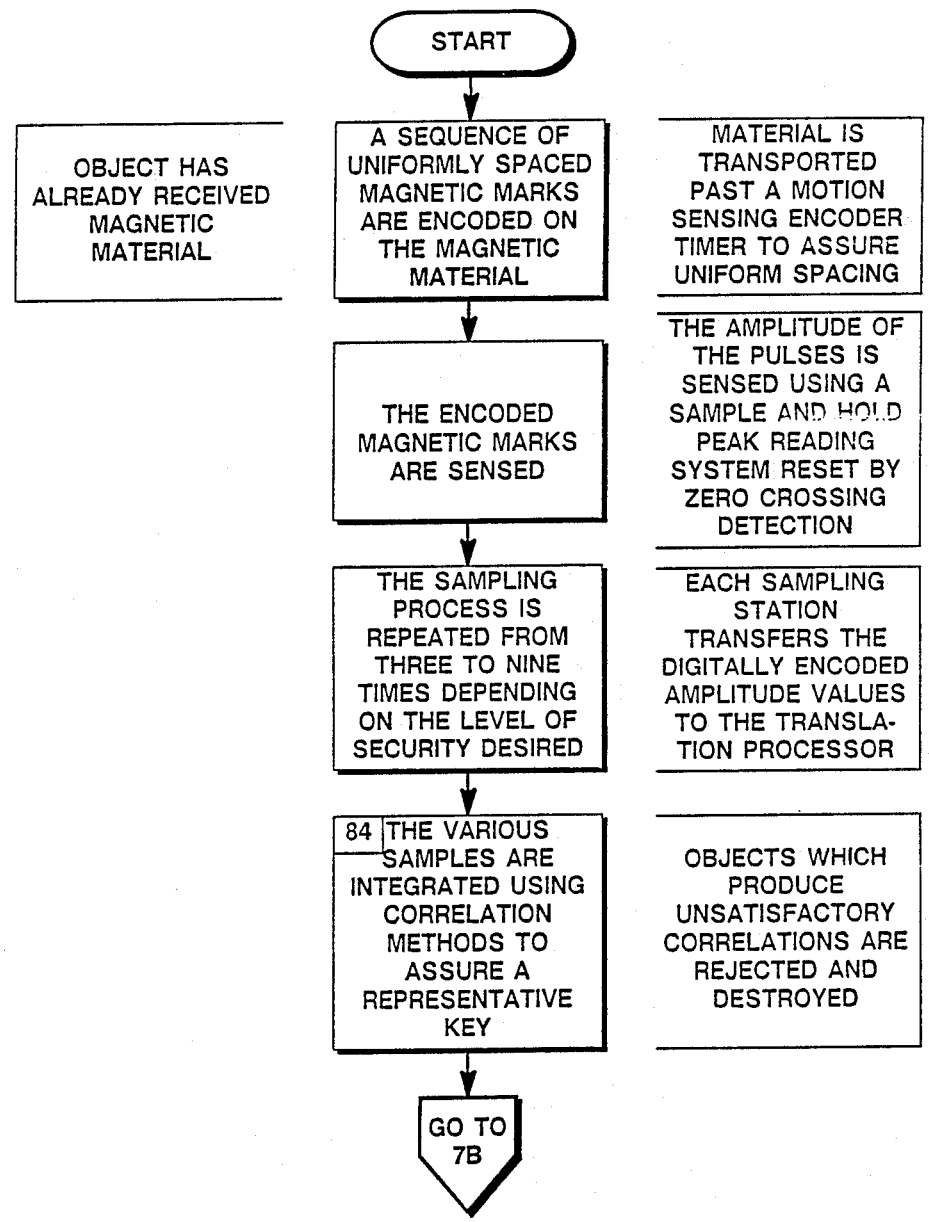
FIGS. 7A and 7B are a flow chart of the steps of a method of sensing and encoding a profile.
Figure 7B:
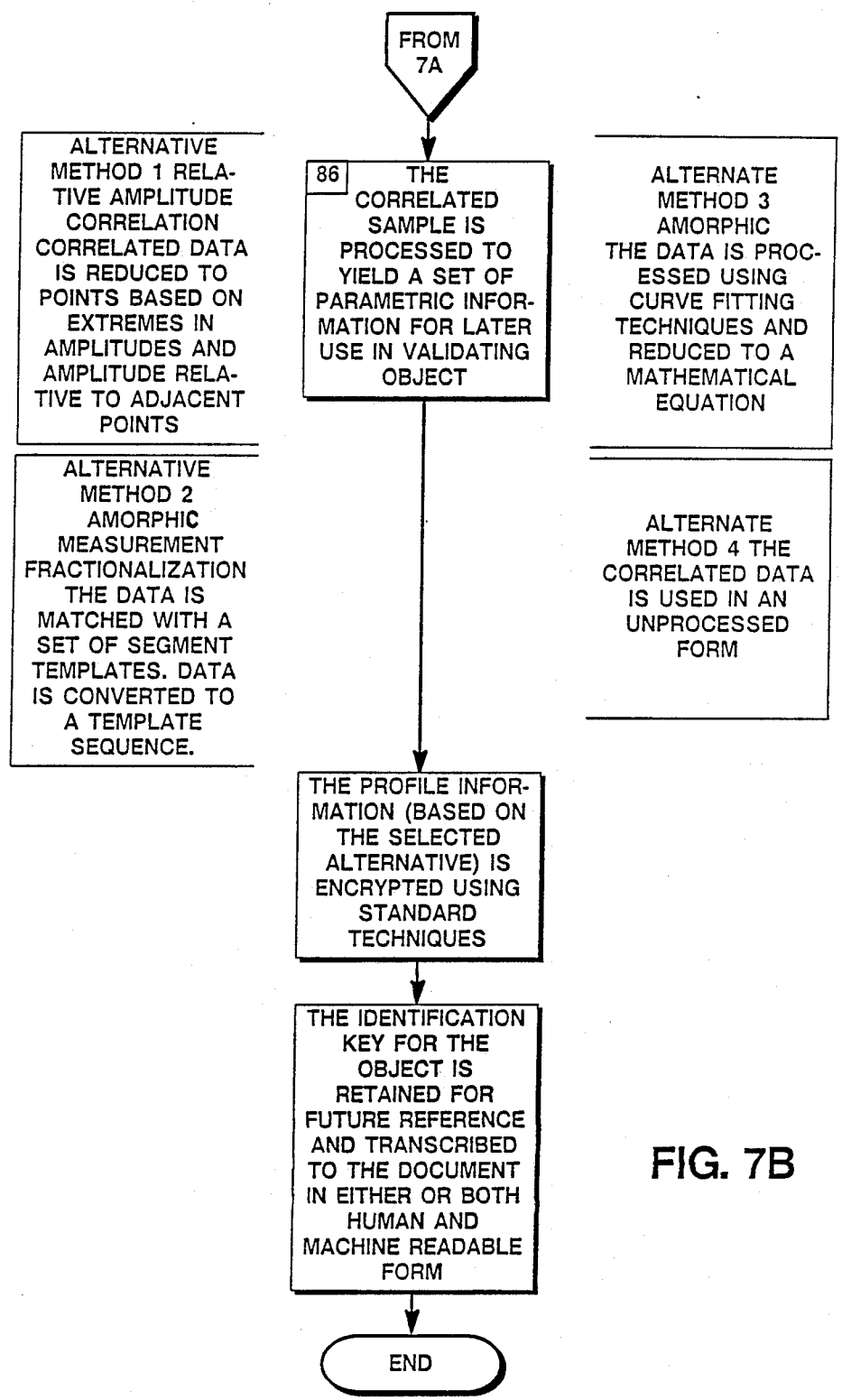

FIGS. 7A, 7B are a flow chart of the steps of the method carried out by the apparatus 40 previously described. At the start of the method, a sequence of uniformly spaced magnetic regions are encoded on the magnetic material. The uniformly spaced magnetic regions are created by the pulse encoder in combination with the write head 42. This corresponds to writing the enhancing signal 22 onto the magnetic region 24.

The encoded magnetic regions are then sensed. For example, in the apparatus 40 sensing is carried out by the plurality of profile read heads 46. The sensing process can be repeat in parallel from 3 to 9 times depending on the desired level of security. In the apparatus 40 the randomly varying profile is detected five times. Five pluralities of data points are created.

A representative key or profile is then formed in a step 84 based on the five sets of separately sensed values. In the event that the digital values which have been separately sensed cannot be correlated, the object or magnetic region can be immediately rejected. The correlated representative profile is then processed in a step 86 so as to create a compressed parametric representation which can be readily recorded on the object for subsequent verification purposes. Alternately, the parametric form of the representation can be retained in a centralized data base instead of written on the object.

FIG. 7B illustrates a plurality of possible forms of parametric representation. In Method 1, a type of delta modulation is used to compress the representative profile into a sequence of displacement values based on relative relationship to adjacent points of maximum amplitude. In Method 2, the processed profile can be encoded into a sequence of predetermined shapes. In this form of encoding, the profile can be represented in a phonetic fashion by a plurality of the geometric shapes corresponding to the shapes of segments of the profile.

A sequence of shapes can then be used to represent a processed profile.

In Method 3, a representative profile, curve fitting techniques can be used to produce a mathematical representation of the profile. Finally, as in Method 4, the processed profile can be used directly in digital form.

If desired, the encoded representative profile can then be encrypted for enhanced security. The encrypted profile can then be recorded on the object either in optically visible or nonoptically visible machine readable form for later verification purposes.

It should be noted that in the event that it is desirable to record the encoded representation on the object in human readable form which is also machine readable, a variety of representations can be used. For example, OCR fonts can be used, magnetic ink character fonts can be used, and/or bar codes can be used.

Figure 8:
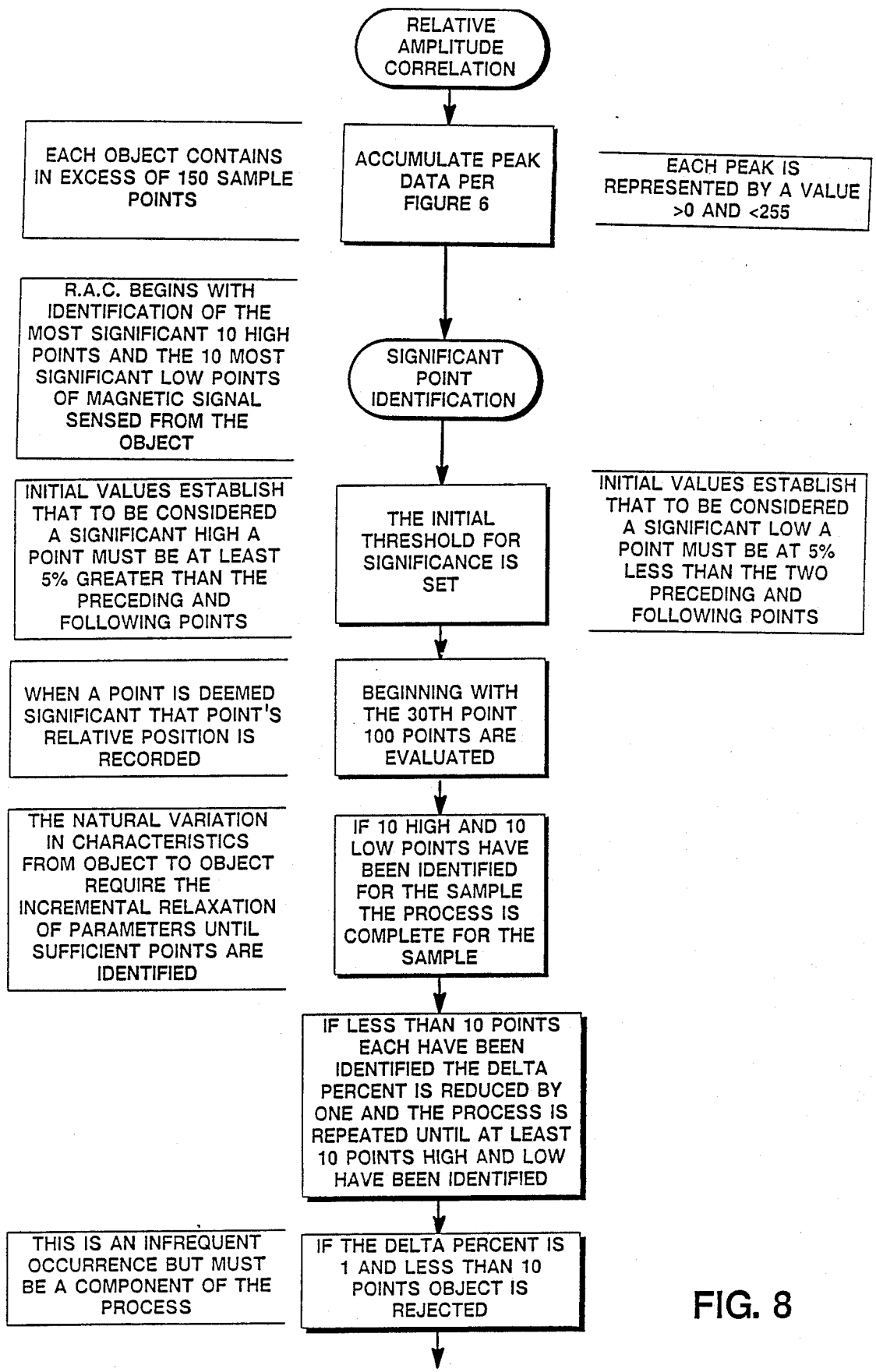
FIG. 8 is a flow chart of the steps of a method of forming a representative profile.

FIG. 8 is a flow chart illustrating the details of the integration step 84 of FIG. 7A. In accordance with the flow chart of FIG. 8, the five sets of detected data points are accumulated. Each set of data points contains in excess of 150 sample points. The most significant 10 high data points and the most significant 10 low data points are identified for each of the five sets of sample points.

An initial threshhold is set to establish that a significant high is defined as a point which is at least 5% greater than the two proceeding and following points. Similarly, an initial threshold is set that requires a significant low to be at least 5% less than the two preceding and following data points. The initial 30 data points are ignored. The evaluation to determine the 10 most significant high points and the 10 most significant low points is started at the 30th point.

One hundred points are evaluated in this process. If 10 high and 10 low points have been identified after an evaluation of 100 sample points the process is completed for that particular sample. If less than 10 significant high points and 10 significant low points have been identified for the sample the 5% threshhold is reduced by 1% and the process is repeated. Each time the 100 data points are evaluated for a given sample and less than 10 highs and less than 10 lows have been identified within the preceeding iteration, the threshhold is reduced another 1% and the process is again repeated.

If the threshold is equal to 1% and less than 10 significant highs and 10 significant low points have been identified then the object is rejected. Otherwise, the identified points of a given sample are compared to the identified points of the other samples. Identified highs or lows which are significant in at least three of the samples are retained for use in forming the representative profile. If less than 10 high and 10 low key values have been identified as significant by at least three of the samples, the object is rejected. If more than 10 high or 10 low points are significant in at least three of the samples, only the first 10 of the high and the first 10 of the low points are used for development of the profile or key.

Figure 9:
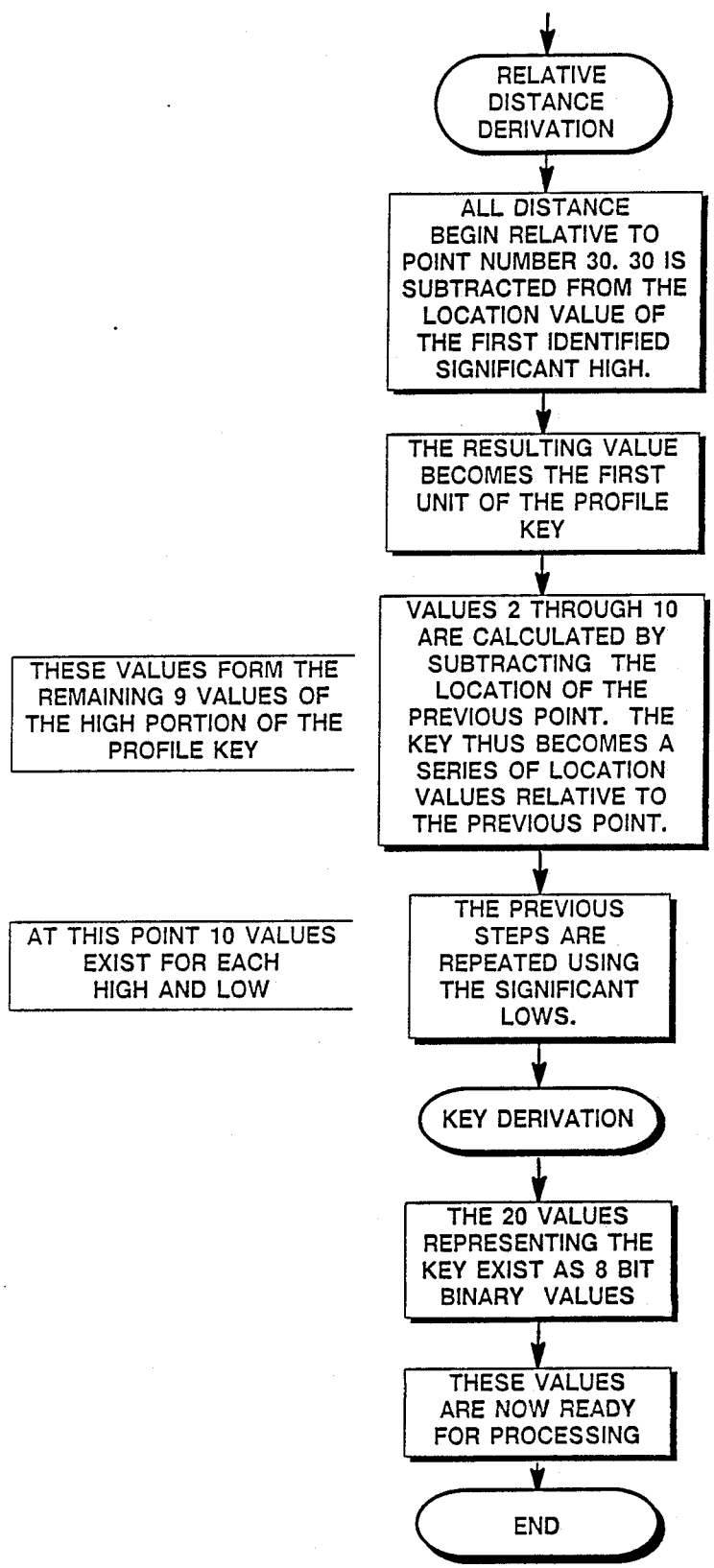
FIG. 9 is a flow chart of the steps of a method of encoding a representative profile for later use.

FIG. 9 is a flow chart of step 86 using Method 1, the relative amplitude correlation, to encode the representative profile or key. It should be noted that the relative amplitude do not appear in the representation of the profile. Rather, only the relative displacements between the significant high and low points which have been identified are used to create the encoded profile.

Since the first 30 data points have been passed over in the evaluation of the data points, a value of 30 is subtracted from the location value of the first identified significant high data point. The resulting value becomes the first unit of the encoded profile or key. Displacement values 2–10 are calculated by subtracting the location of the previous significant high point. The encoded key or profile is thus a series or sequence of location values or increments relative to the previous point. After the incremental values for the 10 significant high data points have been determined, the incremental displacements for the 10 low significant data points are then determined. The sequence of displacements which has been formed represents the encoded key or profile. This sequence of values can now be encrypted as desired. Further, it can be recorded elsewhere in the magnetic material or on the object.

Figure 10:
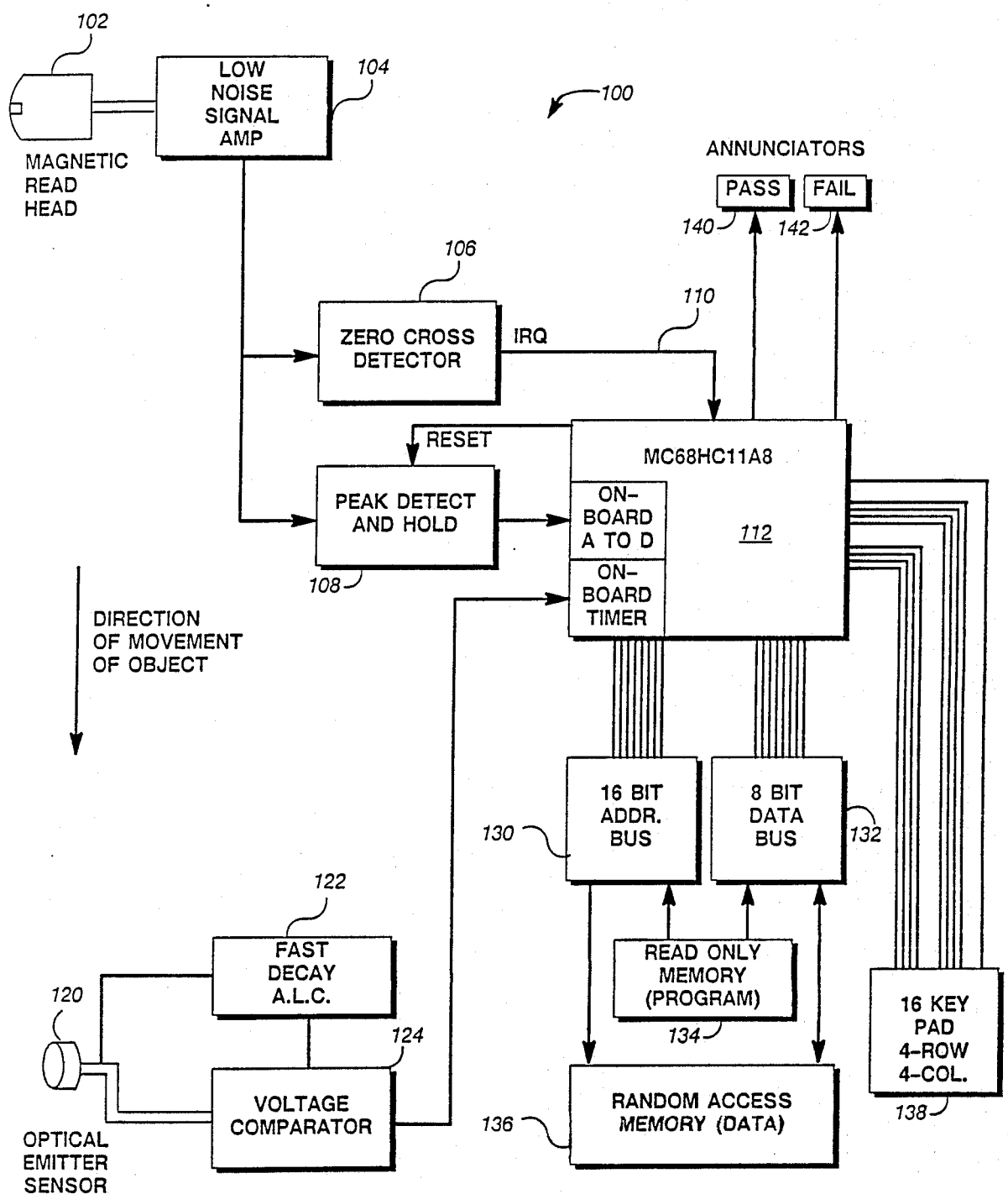
FIG. 10 is a block diagram schematic of an object verification apparatus.

FIG. 10 is a block diagram of a validator 100 which can be used to determine the authenticity of a given object 10 or 14 with an affixed magnetic stripe such as stripe 12 or stripe 16. The purpose of the validator apparatus 100 of FIG. 10 is to sense the randomly varying magnetic characteristic of a magnetic section, such as the section 24, affixed to an object and to also read from the object a pre-recorded encoded form of the representative profile initially created for the object. The validator 100 then performs a comparison between the sensed randomly varying magnetic characteristic which has been digitized and processed and the prestored digitized representative characteristic.

It will be understood that while the prestored representative characteristic can be encoded on the object as described above, it need not be. It is within the spirit and scope of the present invention to locate the prestored representative characteristic in a centralized data base which could then be supplied to the validation apparatus 100, perhaps by telecommunications, for comparison purposes.

The validator apparatus 100 includes a magnetic read head 102 of a conventional variety. The read head 102 can be either the 75 or the 210 bit per inch recording density type. The read head 102 is coupled to a low noise amplifier 104. The output of the low noise amplifier 104 is in turn coupled to a zero crossing detector 106 and a peak detect and hold circuit 108. Output from the zero crossing detector 106 generates a sequence of interrupts on an interrupt request line 110 which is an input to the programmable processor 112. In preferred embodiment, the processor 112 can be a Motorola type MC68HC11A8. Output from the detect and hold circuit 108 is coupled to an analog to digital converter which is integral with processor 112.

As the object moves past the read head 102, a sequence of maxima are detected and digitized by the processor 112. The processor 112 then forms a representation of the profile in digital format which can be compared to a prestored representation of the representative profile.

As the object moves past the magnetic read head 102 the object also passes in front of an optical sensor 120. The sensor 120 both emits a beam of radiant energy and senses reflected radiant energy from an optical pattern affixed to the object. The optical pattern which represents the previously formed representative profile can be affixed to the object in bar code format, or OCR format. Output from the sensor 120 via automatic level control circuitry 122 and comparative circuitry 124 provides a digital input to the processor 112 which represents the pre-recorded representative profile. The prior art teaches a wide variety of techniques and processes for conversion of this digitized optical signal into units of data such as numbers and/or letters.

Also coupled to processor 112 via a 16 bit address bus 130 and an 8 bit data bus 132 are read only memory modules 134 and random access memory modules 136. A control program can be loaded into the read only memory modules 134. The random access memory module 136 can be used for temporary data storage during the validation process.

The validation apparatus 100 also includes a manual input 16 key key pad 138 for operator control purposes. Two annuciators, a pass annunciator 140 and a fail annunciator 142 are provided which can generate optical and audio indicia indicating whether the validation process has detected an authentic object or a nonauthentic object.

With respect to the apparatus 100 of FIG. 10, the magnetic read head 102 can be a Magtek type MT211. Low noise amplifier 104, zero crossing detector circuit 106 and peak detect sample and hold circuit 108 are from the above-identified book the *Encyclopedia of Electronic Circuits*. The bar code sensing circuitry 122 and 124 can be implemented with a Hewlett Packard BCS-7100 module. Read only memory module 134 can be implemented with a type 27C64 circuit. Random access memory module 136 can be implemented with HD6264LP modules. Keyboard 138 can be implemented with a PIPO communications model P3. Indicators 140 and 142 can be green and red light emmitting diodes respectively.

A particular advantage of the present invention is found in that even if the document 14 is folded or creased, thereby disturbing the characteristic of the magnetic region 24, the document may still be verifiable. This is because the profile is sensed off of only a small portion of the total stripe 16. Hence, the probability of distorting the characteristics of the magnetic region 24 at precisely the region where the profile is being sensed is relatively low.

Figure 11A:
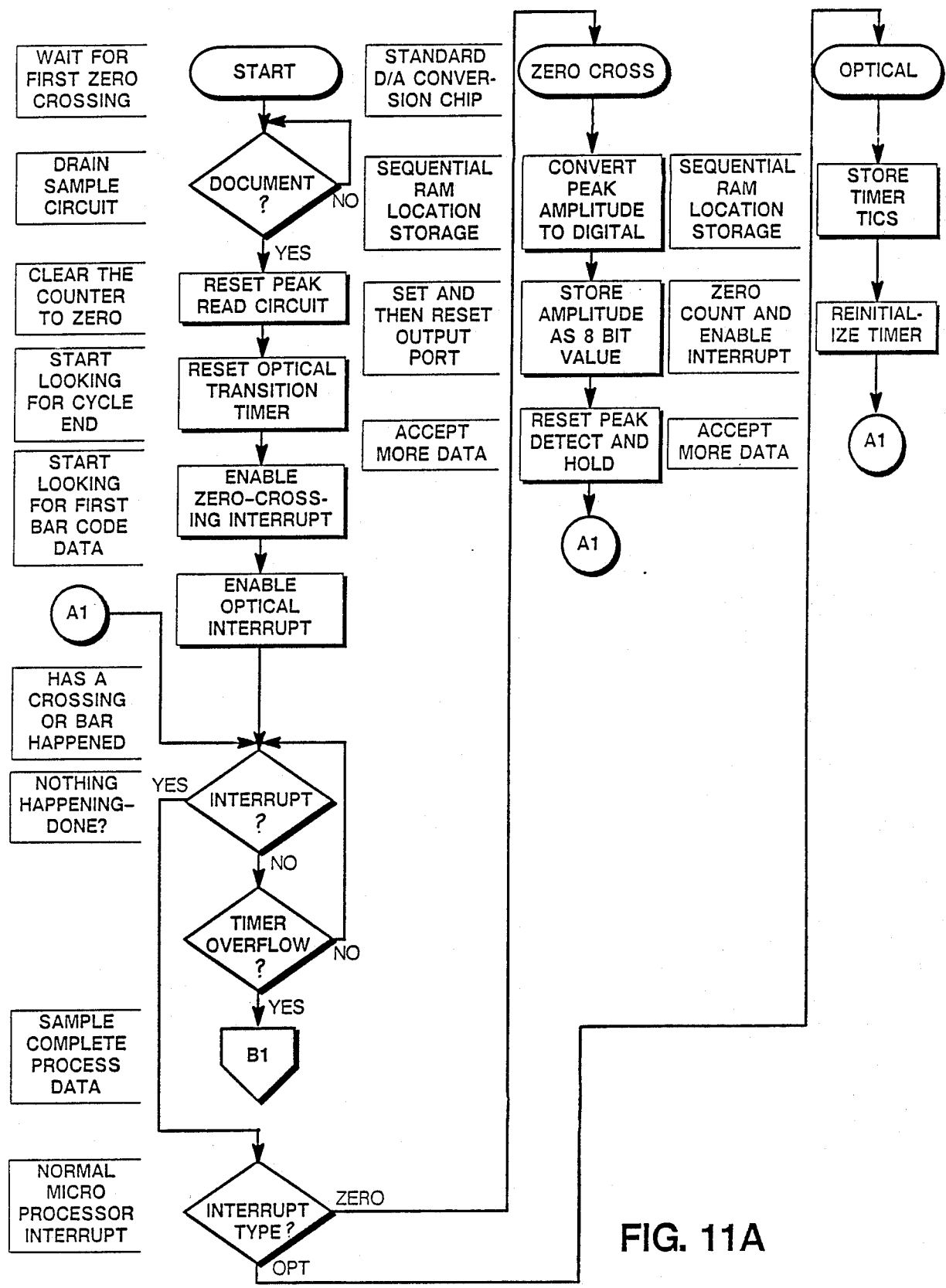
FIGS. 11A and 11B are a flow chart of the steps of a method of validating an object.
Figure 11B:
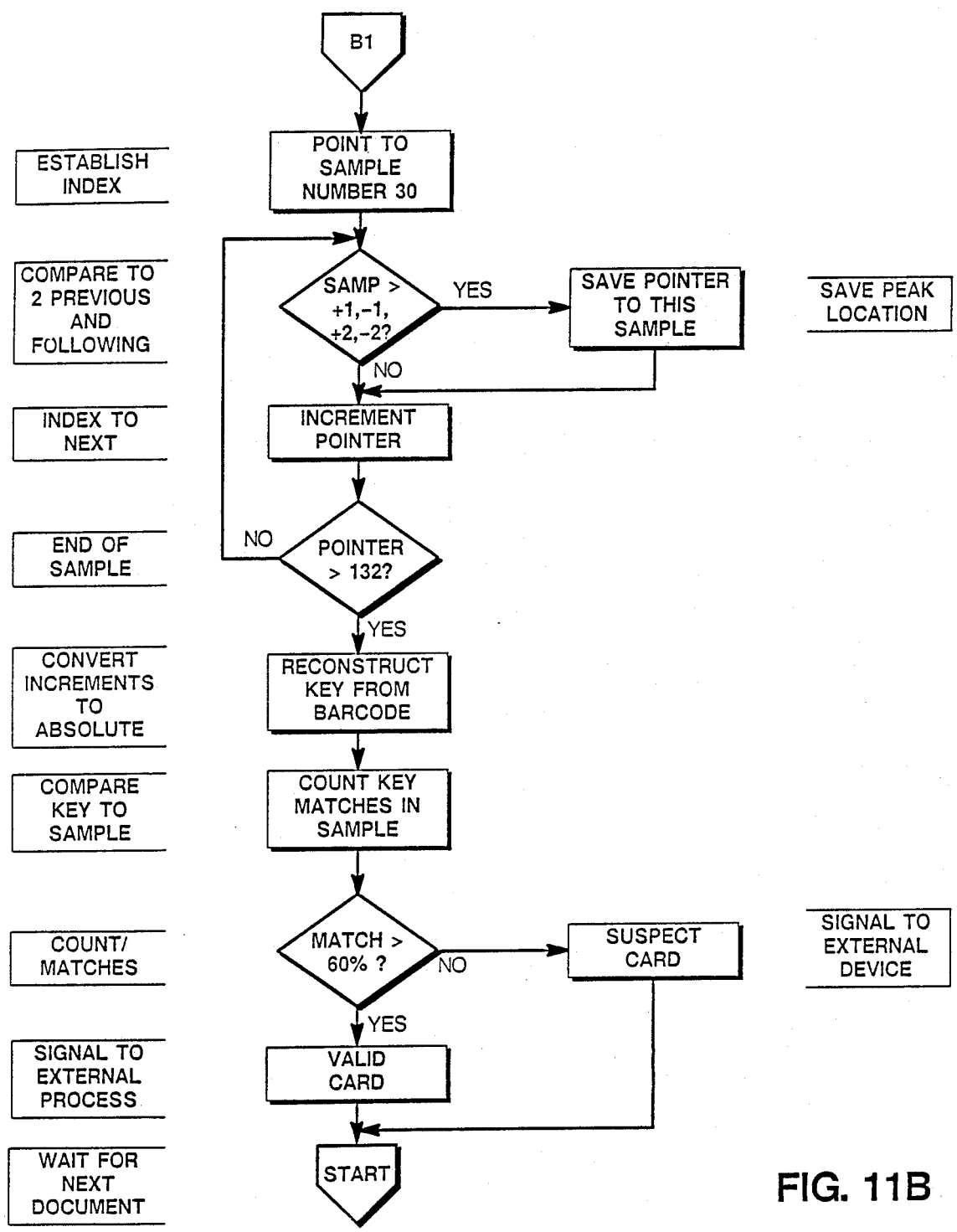

FIGS. 11A and 11B are a flow diagram of a control program storable in the read only memory 134 of the validation apparatus 100 and usable for the purpose of controlling the validation process. In accordance with the flow diagram on FIG. 11A, the process is initiated by sensing an initial zero crossing in the zero crossing detector 106 as the object, is moved passed the magnetic read head 102. After sensing an initial interrupt on the interrupt request line 110, a time out optical transition timer is initialized by the processor 112. Further, the interrupt request line 110 from the zero crossing detector 106 is initialized. An optical interrupt from the optical sensor 120 is also initialized.

Upon sensing an interrupt, its type is detected. In the event that it is a zero crossing as is generated from the magnetic read head 102, the last peak values sensed is converted to a digital representation and stored as a digitized peak value. The peak detect and hold circuitry 108 is reset and the processor 112 waits until the next interrupt is detected.

In the event that an optical interrupt is detected, the timer value is stored and the processor 112 then returns and waits for a further interrupt to be sensed. When the timer overflows indicating that the sample is complete, the data is then processed as illustrated in FIG. 11B. Each digital peak value is compared to two previous and two following locations to obtain the peak location position. This process is iteratively repeated a number of times until 132 sample points have been examined.

The optically sensed, previously stored, representative profile is then compared to the current profile. If there is a match a valid object has been detected. If there is a mismatch, the object is probably not valid.

The extent of match required can be varied based on the degree of security needed. For example, it has been found that with documentary objects with a stripe 16 formed from a slurry deposited during the printing process that adequate security is achieved with a match on the order of 60% or more between the presently sensed digitized magnetic characteristic and the previously stored representative profile.

Further, it will be understood that a magnetic region can be formed with two or more intermixed materials having different magnetic characteristics. As a result of forming a magnetic region including two or more magnetic materials, can be utilized to create a magnetic region having two different detectable profiles. Such an arrangement will provide for an especially high degree of security and verification.

As an alternate to the objects 10, 14 which carry a magnetic region, objects which are magnetic products can also be verified. For example, magnetic tapes or computer disks both rigid and floppy can be verified. A selected electrical signal can be recorded on an unused portion of the magnetic product. The resultant enhanced characteristic can then be sensed. A representative profile can be formed and encoded. The encoded representation can be written onto the object or stored in a central data base for subsequent verification purposes.

Figure 12:
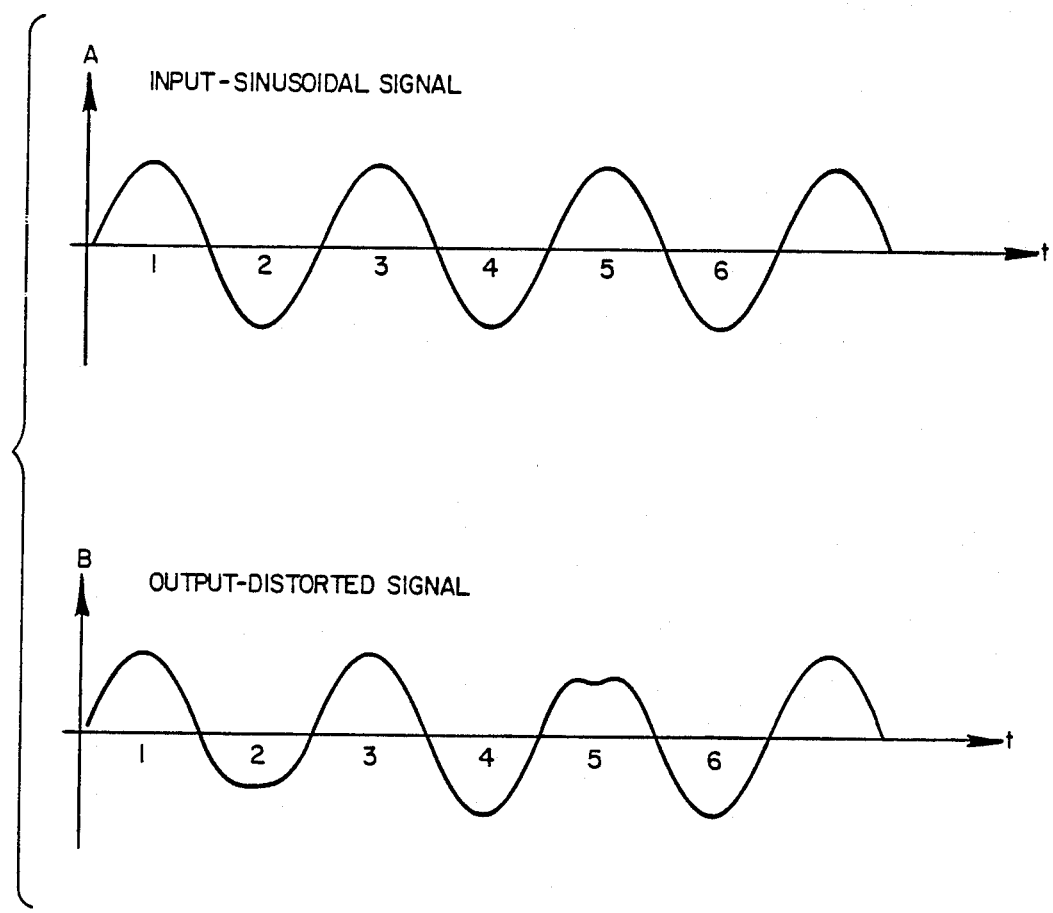
FIG. 12 is a plot of an alternate, analog enhancing signal /and a corresponding output signal illustrating a randomly varying magnetic characteristic of a magnetic product such as a video tape.

FIG. 12 is a graph illustrating use of the present verification system in connection with a magnetic product, such as a magnetic tape. In this instance, a sinusoidal signal as is illustrated in plot A of FIG. 12 could be used for purposes of enhancing the detectable randomly varying magnetic characteristic of the magnetic region. The sinusoidal signal of plot A is recorded on a selected region of the magnetic tape near but not exceeding the saturation level of the tape.

Plot B of FIG. 12 illustrates an output sensed off of the region of the tape on which the enhancing signal of plot A was recorded. As illustrated in plot B, regions 1, 3, 4 and 6 of the output signal faithfully reproduce the input sinusoidal signal. Regions 2 and 5 of the output signal represent distortions of the corresponding regions 2 and 5 of the input signal.

The distortions in portions 2 and 5 of the output signal can be detected since the form of the input, prerecorded, sinusoidal signal is known. These detected randomly varying characteristics can be stored as discussed previously and used to create a representative profile. Subsequently, when it is desired to verify the authenticity of the magnetic tape, the corresponding region can again sensed. The distorted sensed signal can be compared to the stored representative profile. Comparable distorted representations indicate a valid or authentic product.

In the present embodiment, the location of the applied enhancing signal can be specified or determined in a variety of ways. For example, the tape can be physically marked by punching a hole therein or by disturbing the magnetic medium so as to provide a location defining indicia. Alternately, the location of the enhancing signal can be specified electronically. For example, in the case of a video tape the enhancing signal can be written into a location in a predetermined frame on the tape. For verification purposes, the physical location per se need not be known so long as the particular frame on the tape can be located. Similar techniques can be used with other types of magnetic products such as computer disks.

This embodiment is independent of the frequency of the pre-recorded enhancing signal. For example, the enhancing signal could have a frequency in the 12–15 Hz range. Alternately, a 50 KHz could also be used.

It will be understood that in addition to being usable with credit or charge cards, the present verification apparatus and method can be used with debit cards or with multi-use value cards wherein each use decreases the remaining value of the card. This latter category includes multi-use transportation cards.

With respect to creation of a representative profile, it will be understood that depending on the value of the object to be authenticated, more read heads or more data points can be used without departing from the spirit and scope of the present invention. What is important is that the profile creation process be as independent as possible of the speed the object moves past the read head or heads and the calibration of the devices being used.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method of verifying the authenticity of an object which has a continuously extending, recordable, magnetic region thereon with the magnetic region including a randomly varying magnetic characteristic unique to the object with detectability of the characteristic enhanced by an electrical signal pre-recorded on and carried by the magnetic region, the method comprising:
   detecting the enhanced randomly varying characteristic within the recordable magnetic region;
   retrieving a prestored representation of that characteristic;
   comparing the detected randomly varying characteristic of the recordable magnetic region to the retrieved prestored representation; and
   indicating the results of the comparison.

2. A method as in claim 1 with the detectability of the randomly varying magnetic characteristic enhanced by saturation recording at least portions of the electrical signal on the magnetic medium.

3. A method as in claim 2 with the detecting step including a detecting the randomly varying characteristics enhanced by a periodic saturation recorded variations of the magnetic medium.

4. A method as in claim 2 with the detecting step including detecting the randomly varying characteristic enhanced by a non-periodic saturation recorded variation of the magnetic medium.

5. A method as in claim 1 including retrieving the prestored representation from a selected locaton on the object.

6. A method as in claim 1 including retrieving the prestored representation from a selected locaton off of the object.

7. A method as in claim 1 including processing the detected randomly varying characteristic and forming a present representation thereof.

8. A method as in claim 7 including comparing the present representation with the prestored representation.

9. A method as in claim 8 including indicating that the object is authentic where the comparing step disclosed a correspondence between the two representations.

10. A method of verifying the authenticity of an object which has a continuously extending, recordable, magnetic region thereon with the magnetic region including a randomly varying magnetic characteristic unique to the object with detectability of the characteristic enhanced by an electrical signal pre-recorded on and carried by the magnetic region, the method comprising:
    detecting the enhanced randomly varying characteristic within the recordable magnetic region;
    retrieving a prestored representation of that characteristic;
    comparing the detected randomly varying characteristic of the recordable magnetic region to the retrieved prestored representation; and
    indicating the results of the comparison with the detecting step including detecting a plurality of randomly varying peak values with each such value interposed between first and second substantially equal reference values.

11. A method of verifying the authenticity of an object which has a continuously extending, recordable, magnetic region thereon with the magnetic region including a randomly varying magnetic characteristic unique to the object with detectability o the characteristic enhanced by an electrical signal pre-recorded on and carried by the magnetic region, the method comprising:
    detecting the enhanced randomly varying characteristic within the recordable magnetic region;
    retrieving a prestored representation of that characteristic;
    comparing the detected randomly varying characteristic of the recordable magnetic region to the retrieved prestored representation; and
    indicating the results of the comparison
    with the detectability of the randomly varying magnetic characteristic enhanced by saturation recording at least portions of the electrical signal on the magnetic medium including detecting enhanced random variations at a plurality of spaced apart saturation pre-recorded locations of the magnetic region.

12. An apparatus for verifying the authenticity of an object which carries a continuously extending, recordable, magnetic region thereon with the magnetic region containing a randomly varying magnetic characteristic unique to the object, the apparatus comprising:
    means for detecting the randomly varying characteristic of the recordable magnetic region including means for sensing peak values of the randomly varying magnetic characteristic between first and second substantially equal reference values;
    means for retrieving a pre-stored representation of that characteristic; and
    means for comparing the detected randomly varying characteristic of the recordable magnetic region to said retrieved pre-stored representation and for indicating the results of the comparison.

13. An apparatus as in claim 12 with said detecting means including means for sensing the randomly varying characteristic in combination with a pre-recorded variation of the magentic medium.

14. An apparatus as in claim 12 wherein said retrieving means includes means for sensing said prestored representation from a selected locaton on the object.

15. An apparatus as in claim 12 wherein said retrieving means includes means for sensing said prestored representation from a selected location remote from the object.

16. An apparatus as in claim 12 including means for processing said detected randomly varying characteristic and for forming a present representation thereof.

17. An apparatus as in claim 16 with said processing means including means for accumulating a plurality of digital values corresponding to peak values of said randomly varying characteristic.

18. An apparatus as in claim 12 with said comparing means including means for testing for a correspondence between said detected characteristic and said prestored representation.

19. An apparatus as in claim 18 including means for generating a selected indicia in response to said testing means finding said correspondence between the two representations.

20. An apparatus as in claim 12 wherein the magnetic region carries a pre-recorded electrical signal for enhancing the detectability of the randomly varying magnetic characteristic, said detecting means including means for converting the enhanced randomly varying magnetic characteristic to an electrical signal in response to relative motion between the magnetic region and said detecting means.

21. An apparatus as in claim 20 including means for collecting a sequence of peak values of said electrical signal as well as means for forming an identifying profile for the object.

22. An apparatus as in claim 20 with the pre-recorded electrical signal including at least some portions which saturate respective portions of the magnetic region and including means for collecting a sequence of saturation recorded peak values of said electrical signal as well as means for forming an identifying profile for the object.

23. An apparatus as in claim 22 including means for comparing said profile to said pre-stored representation and means for indicating a correspondence therebetween.

24. An apparatus as in claim 20 where the pre-recorded enhancing signal was erased from the magnetic region after said representation was formed and stored, the apparatus including
means for restoring said enhancing electrical signal to the magnetic region prior to detecting the randomly varying characteristic.

25. An apparatus as in claim 24 including:
means for erasing said enhancing electrical signal from the magnetic region subsequent to detecting the randomly varying characteristic.

26. An apparatus as in claim 20 with the pre-recorded electrical signal saturation recorded on the magnetic region.

27. A method of making a verifiable object comprising:
providing a base portion;
providing a recordable region of magnetic material on the base portion;
recording a selected electrical signal on at least a portion of the recordable region so as to enhance the detectability of the randomly varying magnetic characteristic
detecting a continuous, unique, permanent, randomly varying magnetic characteristic within said portion of the region;
forming a unique representation of the detected characteristic; and
storing the unique representation for later reference.

28. A method as in claim 27 including providing a rigid base portion.

29. A method as in claim 27 including providing a flexible base portion.

30. A method as in claim 27 including providing a base portion transmissive of radiant energy.

31. A method as in claim 27 including providing a base portion opaque to radiant energy.

32. A method as in claim 27 including:
depositing the region of magnetic material on the base portion.

33. A method as in claim 32 including:
forming a slurry carrying the magnetic material; and
applying the slurry to a selected region of the base portion.

34. A method as in claim 33 including drying the slurry and forming a layer of magnetic material on the base portion.

35. A method as in claim 34 including directing radiant energy at the applied slurry so as to promote drying.

36. A method as in claim 34 including embossing a part of the applied slurry so as to enhance the detectability of the randomly varying magnetic characteristic.

37. A method as in claim 34 including applying selected magnetic indicia to the base portion, prior to applying the slurry, thereby to emphasize the randomly varying magnetic characteristic.

38. A method as in claim 27 including providing a magnetically recordable magnetic member and permanently affixing said member to said base portion.

39. A method as in claim 27 including recording a time varying digital signal.

40. A method as in claim 41 with the digital signal being saturation recorded on the portion of the magnetic region.

41. A method as in claim 27 including recording a time varying analog signal.

42. A method as in claim 41 with the analog signal being, at least in part, saturation recorded on the magnetic region.

43. A method as in claim 27 with the recordable region having a substantially uniform thickness.

44. A system for making a verifiable object comprising:
means for applying a recordable region of magnetic material to the object;
means for recording a selected electrical signal onto a portion of the recordable region so as to enhance the detectability of the randomly varying magnetic characteristic;
means for sensing a continuous, unique permanent, randomly varying magnetic characteristic of said portion of the region;
means for forming a unique representation of the sensed characteristic; and
means for storing the unique representation for later reference.

45. A system as in claim 44 wherein said applying means includes means for depositing said region of magnetic material on the object.

46. A system as in claim 45 wherein said depositing means includes means for forming a slurry carrying the magnetic material; and means for spreading said slurry along a selected region of the object.

47. A system as in claim 46 including means for drying said slurry thereby forming a layer of magnetic material permanently attached to the object.

48. A system as in claim 47 including means for directing radiant energy at said slurry so as to promote drying.

49. A system as in claim 46 including embossing a part of said applied slurry so as to enhance the detectability of the randomly varying magnetic characteristic.

50. A system as in claim 46 including means for randomly varying a thickness parameter of said region of magnetic material so as to enhance sensing of said randomly varying magnetic characteristic.

51. A system as in claim 46 including means for randomly spraying magnetic material onto the object so as to enhance sensing of said randomly varying magnetic characteristic.

52. A system as in claim 46 in said means for storing includes means for affixing said unique representation to the object in machine readable form.

53. A system as in claim 45 including means for physically displacing portions of said magnetic material so as to enhance sensing of said randomly varying magnetic characteristic.

54. A system as in claim 45 means for affixing a preformed, recordable magnetic tape to the object.

55. A system as in claim 44 wherein said applying means includes means for forming a recordable region having a substantially uniform thickness.

56. A system as in claim 44 including means for generating a time-varying detection enhancing electrical signal to be recorded onto the recordable region.

57. A system as in claim 56 with said recording means including means for saturation recording at least selected portions of the recordable region in response to said time-varying detection enhancing electrical signal.

58. A system as in claim 56 with said means generating a time-varying, discontinuous, enhancing electrical signal.

59. A system as in claim 56 with said means generating a time-varying signal with a continuously varying amplitude.

60. A system as in claim 56 with said means generating a digital signal having st and second amplitude levels.

61. A system as in claim 60 with said digital signal being saturation recorded onto the recordable region.

62. A system as in claim 44 including means for recording a selected sequence of data bits onto the recordable region with said sensing means including means for detecting a continuous, unique permanent randomly varying magnetic characteristic enhanced by said recorded sequence of data bits.

63. A system as in claim 44 including means for identifying a start location of said recorded electrical signal on the object and for encoding said start location on the object for later reference as well as means for erasing said enhancing signal subsequent to storing the unique representation.

64. A verifiable object comprising:
base portion; and
a recordable region of magnetic material on said base portion, said region continuously extending for a selected distance with a detectable, continuous, permanent, randomly varying magnetic characteristic unique to the object and with a verification electrical signal recorded thereon so as to enhance the detectability of said randomly varying magnetic characteristic.

65. An object as in claim 64 with said recorded verification electrical signal being periodic.

66. An object as in claim 65 with said periodic electrical signal being symmetrical about a reference value.

67. An object as in claim 65 with said enhanced randomly varying magnetic characteristic located adjacent an edge of said region.

68. An object as in claim 65 with said enhanced randomly varying magnetic characteristic extending along an edge of said region.

69. An object as in claim 65 with said non-uniform continuously varying magnetic characteristic extending into a portion of said region having a non-uniform thickness.

70. An object as in claim 65 with said recorded verification electrical signal a discontinuously varying two-level electrical signal.

71. An object as in claim 70 with said signal being at least in part saturation recorded onto a portion of said magnetic region.

72. An object as in claim 70 with said two-level signal recorded along an edge of said region.

73. An object as in claim 72 with said two-level signal recorded in a self-clocking format.

74. An object as in claim 64 with a representation of said continuous, randomly varying magnetic characteristic pre-recorded thereon, displaced from said characteristic.

75. An object as in claim 74 with said representation affixed to said base portion.

76. An object as in claim 74 with said representation visibly pre-recorded on the object.

77. An object as in claim 76 with said visible representation including a corresponding machine readable indicia.

78. An object as in claim 77 with said machine readable indicia corresponding to a selected bar code.

79. An object as in claim 74 with said representation pre-recorded on said recordable region.

80. An object as in claim 64 with said recorded verification signal a continuously varying electrical signal.

81. An object as in claim 64 including selected discontinuous magnetic indicia positioned on said base underlying at least in part, said recordable region so as to enhance said detectability of said randomly varying magnetic characteristic.

82. An object as in claim 81 with said indicia including a plurality of elongated magnetic members.

83. An object as in claim 81, with said indicia including a member detectable for definition of a start of said verification signal recorded on said region of magnetic material.

84. A verifiable object comprising:
a base portion; and
a recordable region of magnetic material on said base portion, said region continuously extending for a selected distance with a detectable, continuous, permanent, randomly varying magnetic characteristic unique to the object and with a verification electrical signal recorded thereon so as to enhance the detectability of said randomly varying magnetic characteristic with a representation of said continuous, randomly varying magnetic characteristic pre-recorded thereon, displaced from said characteristic and
with said representation encoded using a technique from a group including; absolute encoding, parametric encoding, relative maxima encoding phonetic encoding.

85. An object having a unique verifiable characteristic comprising:
a substrate; and
a recordable region of substantially uniform, magnetic material formed on said substrate, said region continuously extending for a selected distance and including a detectable permanent, non-uniform, magnetic characteristic unique to the object with a digital representation of said non-uniform magnetic characteristic carried by said substrate in a location displaced from said characteristic with said representation encoded using a technique from a group including; absolute encoding, parametric encoding, relative maxima encoding, phonetic encoding.

86. An object as in claim 85 with a selected characteristic enhancing electrical signal recorded thereon.

87. An object in claim 86 with said digital representation of said non-uniform magnetic characteristic pre-recorded on said recordable medium.

88. An object as in claim 86 with said non-uniform magnetic characteristic located adjacent an edge of said region.

89. An object as in claim 86 with said non-uniform magnetic characteristic extending along an edge of said region.

90. An object as in claim 86 with said non-uniform magnetic characteristic extending into said recordable region.

91. An object as in claim 86 with said electrical signal a discontinuously varying multi-level electrical signal.

92. An object as in claim 91 with said multi-level signal recorded along an edge of said region.

93. An object as in claim 91 with said multi-level signal recorded in a self-clocking format.

94. An object as in claim 91 wherein said multi-level electrical signal is recorded so as to saturate selected portions of said region.

95. An object as in claim 86 with said electrical signal a continuously varying electrical signal.

96. An object as in claim 85 including selected discontinuous magnetic indicia positioned on said substrate underlying at least in part, said recordable region so as to enhance said non-uniform magnetic characteristic.

97. An object as in claim 96 with said indicia including a plurality of elongated magnetic members.

98. An object as in claim 96 with indicia including a member detectable for definition of a beginning of a portion of said magnetic region at which said electrical signal is to be recorded.

99. An object having a unique verifiable characteristic comprising:
a substrate; and
a recordable region of magnetic material on said substate, said region having a first portion for recording selected transaction information and a second non-transaction portion, displaced from said first portion, said second portion continuously extending for a selected distance and including a permanent, continuous, detectable randomly varying magnetic verification characteristic unique to the object and having a selected electrical signal recorded on a section of said second portion so as to enhance the detectability of said randomly varying characteristic.

100. An object as in claim 99 with a representation of said continuous, randomly varying magnetic characteristic pre-recorded on said first portion.

101. An object as in claim 99 with a representation of said continuous, randomly varying magnetic characteristic pre-recorded on said second portion, displaced from said characteristic.

102. An object as in claim 99 with said electrical signal recorded so as to saturate selected parts of said second portion.

103. An object as in claim 102 with said electrical signal a multi-level, time varying digital signal.

104. An object as in claim 99 with said randomly varying magnetic characteristic located adjacent an edge of said region.

105. An object as in claim 99 with a digitized representation of said randomly varying magnetic characteristic recorded on said region.

106. An object as in claim 105 with said electrical signal a discontinuously varying digital electrical signal.

107. An object as in claim 106 with said digital signal recorded along an ed of said region.

108. An object as in claim 107 with said digital signal recorded in a self-clocking format.

109. An object as in claim 111 with said electrical signal a continuously varying electrical signal.

110. An object as in claim 105 including selected discontinuous magnetic indicia positioned on said substrate underlying, at least in part, said recordable region so as to enhance said detectability of said randomly varying magnetic characteristic.

111. An object as in claim 110 with said indicia including a plurality of elongated magnetic members.

112. An object as in claim 110 with said indicia including a member detectable for definition of a beginning of said randomly varying magnetic characteristic.

113. An object as in claim 99 with said randomly varying magnetic characteristic extending into a variable thickness region of said second portion.

114. An object having a unique verifiable characteristic comprising:
a substrate; and
a recordable region of magnetic material on said substrate, said region having a first portion for recording selected transaction information and a second non-transaction portion, displaced form said first portion, said second portion continuously extending for a selected distance and including a permanent, continuous, detactable randomly varying magnetic verification characteristic unique to the object and having a selected electrical signal recorded on a section of said second portion so as to enhance the detectability of said randomly varying characteristic with a representation of said continuous, randomly varying magnetic characteristic pre-recorded on said substrate.

115. An object as in claim 114 with said representation pre-recorded in a machine readable format.

116. An object as in claim 115 with said machine readable format including a code.

117. A verifiable item comprising:
a substrate;
a recordable magnetic stripe deposited on a region of said substrate and a coating, said stripe having at east one region with a detactable, permanent randomly varying magnetic characteristic;

a preselected, varying electrical signal pre-recorded on said region so as to enhance detactability of said varying magnetic characteristic; and a representation of said varying magnetic characteristic carried by said substrate with said representation encoded using technique from a group including; absolute encoding, parametric encoding, relative maxima encoding, phonetic encoding.

118. An item as in claim 117 wherein said varying electrical signal is, at least in part, saturation recorded on said region.

119. An item as in claim 118 wherein said electrical signal is recorded starting at a location specified by an indicium carried on said item.

120. A method of forming a representative profile of an object carrying a recordable magnetic region onto which an electrical signal can be recorded, the electrical signal enhances the detectability of a randomly varying characteristic of the magnetic region, the method comprising:

providing the magnetic region;

recording the detectability enhancing signal onto the magnetic region;

detecting the randomly varying characteristic of the magnetic region at least once; and collecting at least a first plurality of spaced apart peak values of the detected randomly varying magnetic characteristic.

121. A method as in claim 120 including collecting a second plurality of spaced apart peak values.

122. A method as in claim 121 wherein the members of the first plurality all have a first polarity.

123. A method as in claim 122 wherein the members of the second plurality all have a second polarity.

124. A method as in claim 123 wherein the first polarity is opposite the second polarity.

125. A method as in claim 121 wherein the first polarity of peak values is encoded by forming a first sequence, the members of which define the relative displacement between adjacent peak values of the first plurality, and wherein the second polarity of peak values is encoded by forming a second sequence, the members of which define the relative displacement between adjacent peak values of the second plurality.

126. A method as in claim 120 wherein the first plurality of peak values is encoded by forming a sequence the members of which define the relative displacement between adjacent peak values of the first plurality.

127. A method as in claim 126 including digitizing the members of the first plurality.

128. A method as in claim 127 with the encoding sequence formed as a plurality of digitized representations of the relative displacements.

129. A method as in claim 120 including:

detecting the randomly varying characteristic a plurality of times; and forming a family of corresponding pluralities of peak values, one plurality for each detected characteristic.

130. A method as in claim 129 including comparing corresponding peak values of different pluralities and forming a representative profile having a plurality of peak values selected from among those common to a pre-determined number of the pluralities in the family.

131. A method as in claim 130 including encoding the representative profile by forming a sequence the members of which define the relative displacement between adjacent peak values of the representative profile.

132. A method as in claim 131 including storing the encoded profile for later retrieval 133. A method as in claim 132 including:

re-detecting the randomly varying magnetic characteristic;

collecting a plurality of spaced apart peak values of the re-detected randomly varying characteristic;

encoding the plurality of peak values;

retrieving the encoded representative profile;

comparing the encoded representative profile to the encoded plurality of peak values; and indicating the presence or absence of a correspondence therebetween.

* * * * *

UNITED STATES PATENT AND TRADEMARK OFFICE
CERTIFICATE OF CORRECTION

PATENT NO. : 4,837,426

DATED : June 6, 1989

INVENTOR(S) : Kevin J. Pease; Robert A. Copella; Ann M. Flannery

It is certified that error appears in the above-identified patent and that said Letters Patent is hereby corrected as shown below:

IN THE SPECIFICATION:

Column 2, line 36, substitute --sensed-- for "sense";

Column 6, line 2, substitute --characteristic-- for "characteristics";

Column 7, line 41, delete the "/" before the word "and";

Column 9, line 33, substitute --ways-- for "way";

Column 13, line 55, substitute --an-- for "a";

Column 13, line 58, after the numeral "74" substitute a period --.-- for "and", then insert --the zero crossing detector 74 is coupled to--; and

IN THE CLAIMS:

Column 20, line 5, substitute --discloses-- for "disclosed";

Column 20, line 31, substitute --of-- for "o";

Column 22, line 40, substitute the numeral --39-- for the numeral "41";

Column 23, line 23, "in" should read --wherein--.

Column 23, line 30, insert --including-- after the numeral "45";

Column 23, line 49, substitute --first-- for "st";

Column 25, line 44, insert --recordable-- after "said";

Column 25, line 53, insert --said-- after "with";

Column 26, line 25, substitute --edge-- for "ed";

Column 26, line 28, substitute the numeral --105-- for the numeral "111";

Column 26, line 50, substitute --from-- for "form";

Column 26, line 64, insert --bar-- after "a";

UNITED STATES PATENT AND TRADEMARK OFFICE
CERTIFICATE OF CORRECTION

PATENT NO. : 4,837,426

DATED : June 6, 1989

INVENTOR(S) : Kevin J. Pease; Robert A. Copella; Ann M. Flannery

It is certified that error appears in the above-identified patent and that said Letters Patent is hereby corrected as shown below:

Column 27, line 1, substitute --least-- for "east"; and

Column 27, line 8, insert --a-- after "using".

Signed and Sealed this

Eighth Day of May, 1990

Attest:

HARRY F. MANBECK, JR.

*Attesting Officer*   *Commissioner of Patents and Trademarks*